Dec. 27, 1960  R. T. DUNGAN ET AL  2,966,140
TURBO JET CONTROL SYSTEM
Filed Sept. 21, 1954  7 Sheets-Sheet 1

Fig. 1.

INVENTORS,
RICHARD T. DUNGAN, HENRY A. LONG,
ALBERT F. STUPKA, BURT L. TAYLOR,
JAMES C. WISE

BY R. E. Geauque
ATTORNEY

Fig. 6.

Dec. 27, 1960   R. T. DUNGAN ET AL   2,966,140
TURBO JET CONTROL SYSTEM
Filed Sept. 21, 1954   7 Sheets-Sheet 7

INVENTORS
RICHARD T. DUNGAN, HENRY A. LONG,
ALBERT F. STUPKA, BURT L. TAYLOR,
JAMES C. WISE

BY R. E. Geauque
ATTORNEY

United States Patent Office 2,966,140
Patented Dec. 27, 1960

2,966,140

TURBO JET CONTROL SYSTEM

Richard T. Dungan, Encino, Henry A. Long and Albert F. Stupka, Van Nuys, Burt L. Taylor, Fullerton, and James C. Wise, Woodland Hills, Calif., assignors to The Marquardt Corporation, a corporation of California Filed Sept. 21, 1954, Ser. No. 457,388

3 Claims. (Cl. 121—41)

This invention relates to a turbojet control system and more particularly to a control system for controlling the starting and thrust output of a gas turbine prime mover, while preventing certain engine limits from being exceeded. The invention is applicable to gas turbines generally, whether equipped with an axial, centrifugal or mixed flow compressor and whether or not equipped with afterburner and/or variable area exhaust nozzle. More specifically, the control system of the present invention is operable to control the relationship between thrust and power lever position through the range from idle, non-afterburning operation through full rich afterburning operation of the engine and also, is operable to control the starting of the engine from ignition to idle. At the same time, the system prevents the engine from exceeding the following limits, namely, compressor stall, maximum turbine discharge temperature, maximum compressor discharge pressure, maximum rotative speed, lean blow-out and rich blow-out.

Present control systems utilize electronic equipment which is very complex and is subject to being damaged by engine vibrations and heat. Such electronic equipment also has the disadvantage that it is dependent upon the electrical power source of the aircraft in which the gas turbine is mounted. In most present control systems, engine speed is controlled by the main burner fuel flow, while turbine discharge temperature is controlled by the exit nozzle area and this control system suffers from inter-activity between loops which has caused difficulty in obtaining stable operation. However, the ideal control loops connect fuel flow with turbine inlet temperature and exhaust nozzle area with engine speed and the present invention approaches this ideal since compressor pressure ratio is combined with compressor inlet total temperature to obtain a measure of turbine inlet temperature. Some prior control systems prevent stalling by scheduling their turbine discharge temperature or fuel flow (or some form of fuel flow parameter) against actual engine speed. The predictions of stall for control systems using fuel flow or a fuel flow parameter depend upon constancy of performance of the main burners and of fuel properties. The predictions of stall for systems scheduling turbine discharge temperature against actual engine speed are in error during an acceleration, even when corrected by compressor inlet total temperature due to the fact that additional turbine energy is required for acceleration. However, in the present invention, compressor pressure ratio is scheduled against corrected rotative speed and therefore, the control parameter depends only on the compressor characteristics. As used herein, corrected engine speed is defined as rotative speed divided by the square root of the engine total inlet temperature. Also, the present invention controls steady-state maximum turbine discharge temperature of engines having variable area exits by computation of the temperature ratio of turbine discharge temperature to compressor inlet temperature from the relationship of compressor pressure ratio and corrected engine speed and it is unnecessary to measure the turbine discharge temperature by thermocouples, as is done in prior systems, in order to control the temperature to the maximum value by operations of either the fuel valve or the exit nozzle. However, for positive control, a turbine discharge temperature senser is provided for positive override of the fuel valve.

By the present invention, a control system is provided which operates independently of any electrical source. Also, the engine will operate at the best available economy, regardless of flight conditions, since the system schedules against constant corrected speed over most of the engine thrust range by correcting the rotative speed of the engine for changes in engine total temperature. The parameters chosen for control purposes are less affected by engine efficiencies than the parameters of past control systems and the material parameters of the compressor are used to prevent compressor stall. Further, the control loops of the present invention have the advantage of a minimum of interaction so that each loop is as independent as possible in its operation.

It is therefore an object of the present invention to provide a turbojet control system for controlling the thrust output of a gas turbine prime mover, which system is wholly pneumatic and hydraulic in its operations.

Another object of the invention is to provide a system which controls to constant corrected speed over most of the engine thrust range so that the engine will operate at nearly the best economy regardless of the flight conditions.

A further object of the invention is the provision of a control system for controlling the thrust output of a gas turbine throughout its entire output range, whether or not the engine is equipped with afterburner and/or variable nozzle.

A still further object of the invention is to provide a system for controlling the thrust output of a gas turbine while simultaneously preventing the engine from operating under conditions which will injure the engine structure or cause the engine to fail.

Another object of the invention is the provision of a control system for a turbojet engine having control parameters which are affected as little as possible by engine efficiencies and having control loops which have a minimum of inter-action.

A further object of the invention is to provide a control system which corrects fuel flow with turbine inlet temperature and corrects exhaust nozzle area with engine speed.

A still further object of the invention is to combine compressor pressure ratio with compressor inlet total temperature to obtain a measure of turbine inlet temperature.

These and other objects of the invention not specifically set forth above will become readily apparent from the following description and drawings in which:

The embodiment of the invention illustrated hereby contemplates a control system for a turbojet engine having a variable area exit and an afterburner but, of course, the invention is equally applicable to turbojet engines without variable area exits and afterburners. The drawings illustrate different portions of a single control system and should be considered together.

*Pressure ratiometer*

Figure 1:
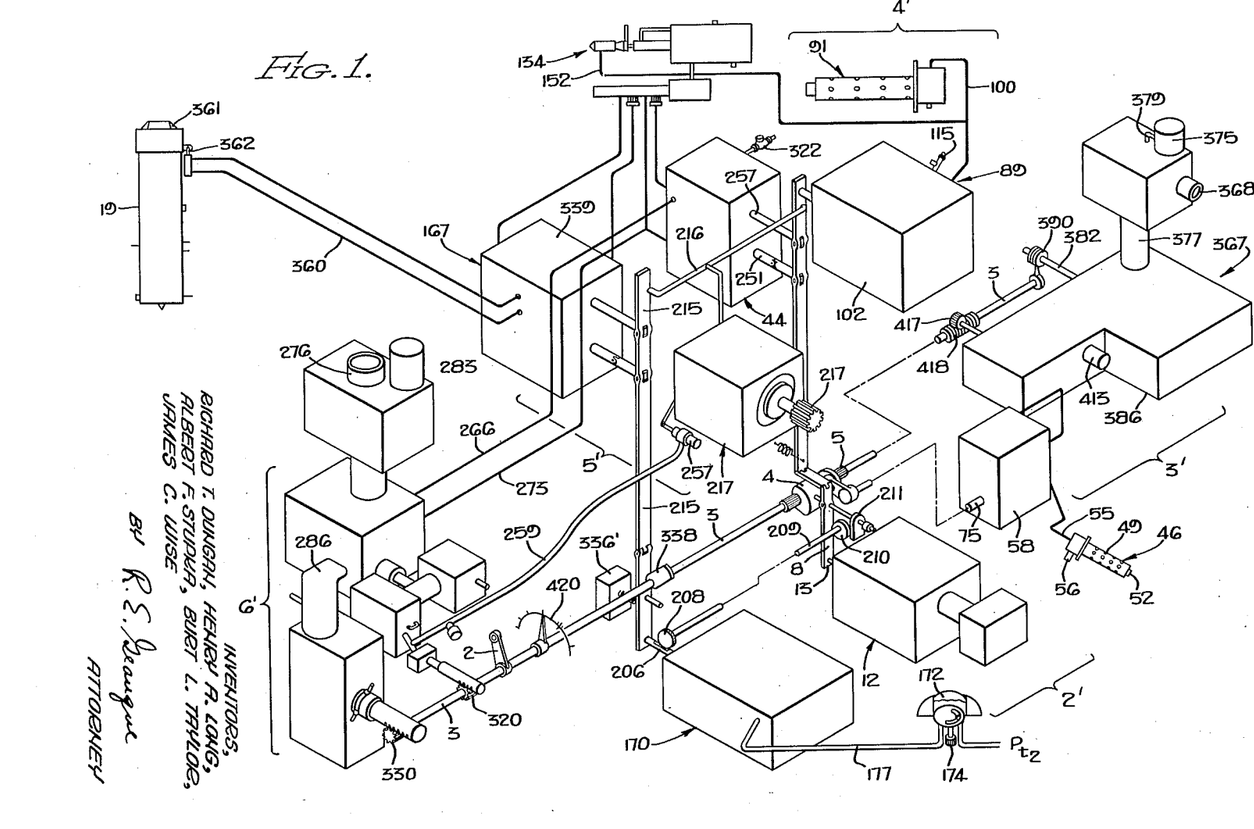
Figure 1 is a diagrammatic perspective view of the complete control system in which the various components are connected with the turbojet engine.
Figure 2:
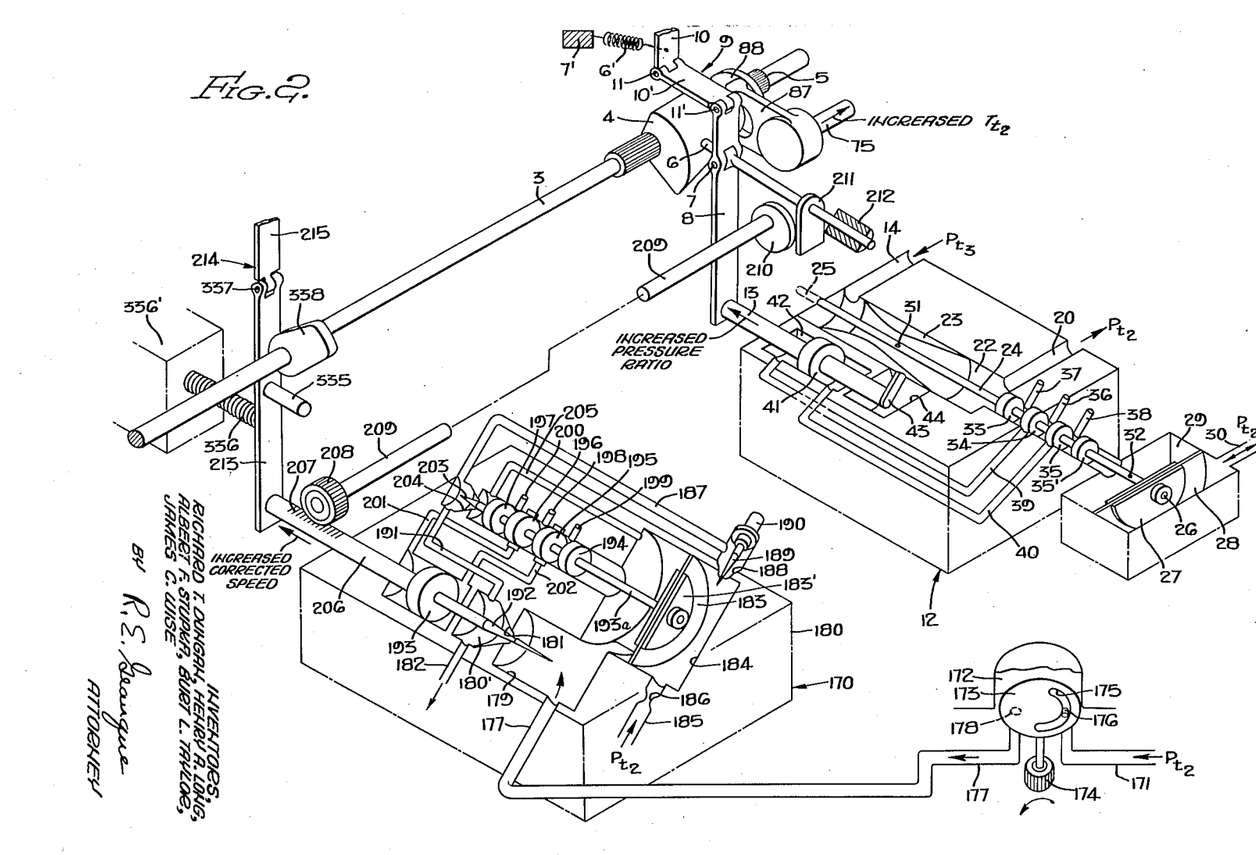
Figure 2 is a perspective view of a portion of the control system designated by numeral 2' in Figure 1 showing the control shaft connected to the pressure ratio selector cam and illustrating the construction of devices for measuring compressor pressure ratio and corrected speed.
Figure 5:
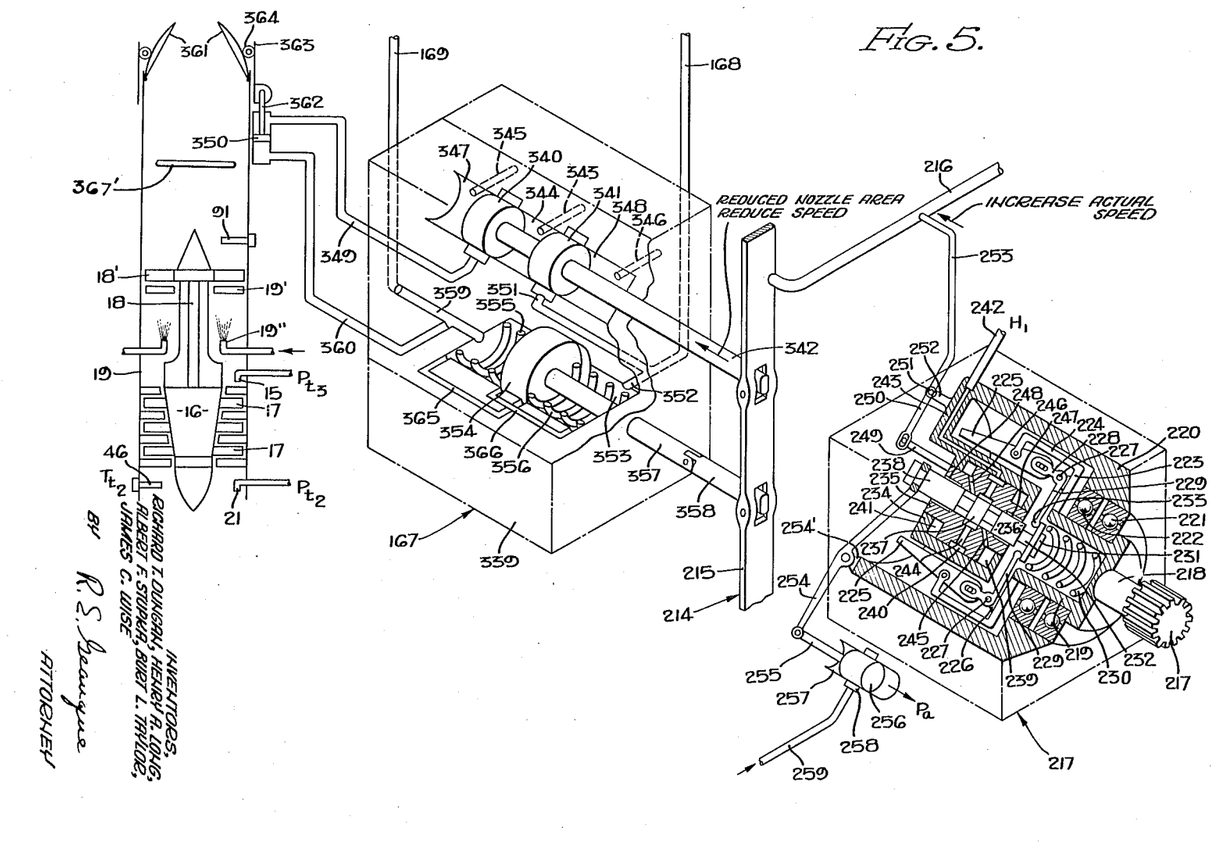
Figure 5 is a perspective view of a portion of the control system designated by numeral 5' in Figure 1 illustrating the exit nozzle computer and the true speed senser.
Figure 6:
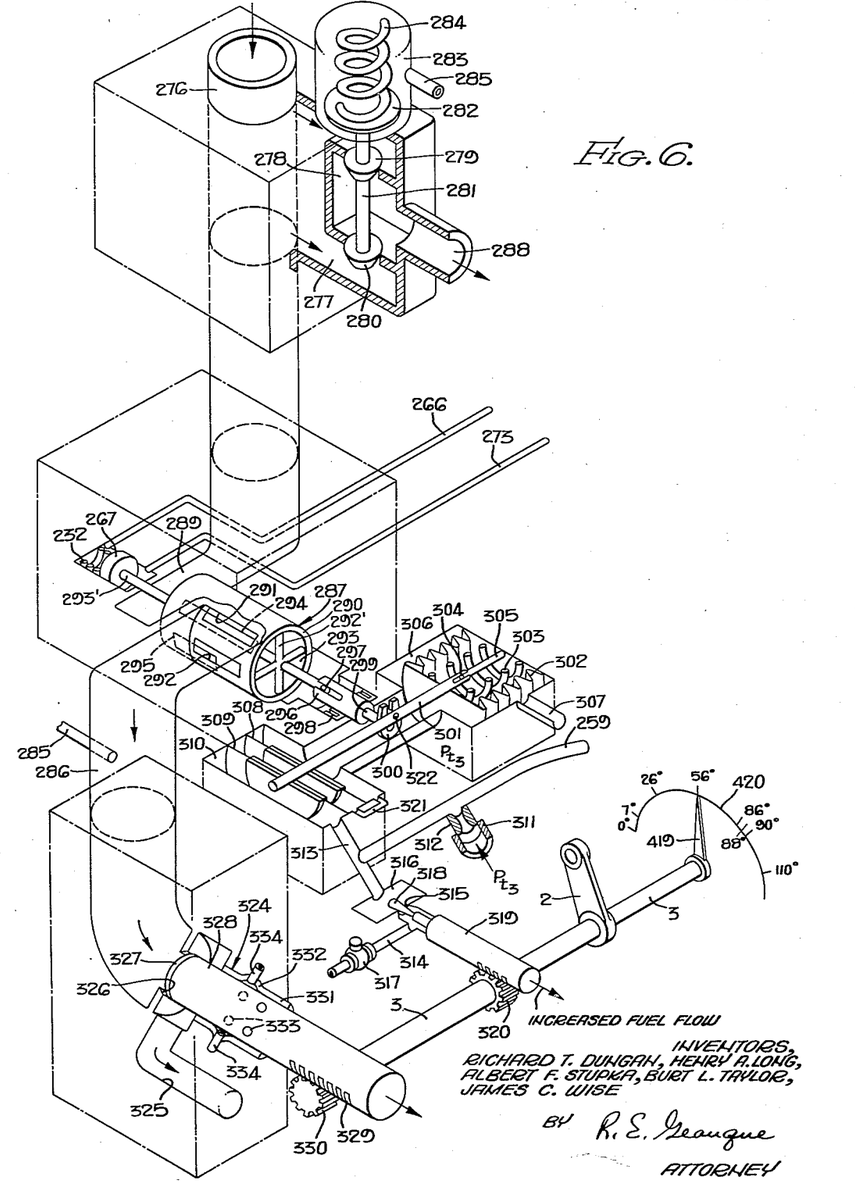
Figure 6 is a perspective view of a portion of the control system designated by numeral 6' in Figure 1 showing the fuel pressure regulator, the fuel valve and the cut-off valve.

Referring to Figures 2 and 6, a manual control lever 2 is rigidly secured to a control shaft 3 which slidably mounts a control cam 4 on serrated portion 5. A shaft 6 is pivotally connected by pin 7 to arm 8 of control lever 9 and the end of the shaft 6 is continually forced against the cam 4 by a tension spring 6' connected between arm 10 of lever 9 and stationary support 7'. The intermediate arm 10' of lever 9 is pivotally connected between arms 10 and 8 by pivots 11 and 11' respectively. A ratiometer device 12 has its output shaft 13 positioned to contact one end of arm 8 at a position opposite from pin 11' so that cam 4 is positioned between the output arm and the pin. The ratiometer has a passage 14 which connects with the total pressure pickup 15 at the discharge side of the compressor 16 (see Figure 5) in order to sense the total discharge pressure $(P_{t_3})$. The compressor has a series of blades 17 and is driven by engine shaft 18, centrally located within cowling 19 of the engine and connected to turbine 18'. The ratiometer also has a passage 20 which connects with the total pressure pickup 21 at the entrance of the compressor in order to sense total inlet pressure $(P_{t_2})$. The passages 14 and 20 connect at opposite end of a space 22 which contains a de Laval nozzle 23 slidable within the space and the difference between pressures $(P_{t_3})$ and $(P_{t_2})$ is sufficient to cause sonic or slightly subsonic velocity flow at the throat of the nozzle. A pickup tube 24 is centrally located in the nozzle and is slidably supported at end 25 in the casing of the ratiometer 12. The other end 26 of tube 24 is connected to supported members 27 for diaphragm 28 located within space 29 and a passage 30 connects one side of the diaphragm with the pressure $(P_{t_2})$. The pickup tube 24 contains a pickup opening 31 located within nozzle 23 and a second opening 32 transmits the pressure sensed by opening 31 to the side of diaphragm 28 opposite to that receiving the pressure $(P_{t_2})$. The tube 24 mounts four valve portions 33, 34, 35 and 35' which cooperate with high pressure hydraulic line 36 and low pressure lines 37 and 38 in order to regulate, in a well-known manner, the pressure transmitted by lines 39 and 40 to opposite sides of piston 41, carried by shaft 13 and located within space 42. The shaft 13 has a follow-up link 43 movable within space 44 and connected to nozzle 23 in order to provide the usual follow-up action between the nozzle and the piston. The pressure distribution along the nozzle 23 is determined by the pressure $(P_{t_3})$ and the ratio between the area of the nozzle at any selected point and the throat area. Thus, the varying pressure along the nozzle can be measured by opening 31 as it moves along the nozzle. It is therefore apparent that for any given value of pressure $(P_{t_3})$, the pick-up tube 24 will be moved by diaphragm 28 until the pressure sensed by opening 31 just balances the pressure $(P_{t_2})$ on the diaphragm. This movement of the tube 24 will move valve portions 33—35' so that the position of shaft 13 will be determined by the ratio between $(P_{t_3})$ and $(P_{t_2})$. Any increase in this pressure ratio will cause opening 31 to move in the direction of diaphragm 28 and this movement will cause shaft 13 to move in the opposite direction towards arm 8 and, of course, upon a decrease in pressure ratio, the opening 31 and shaft 13 will each move in the opposite direction. The movement of shaft 13 will cause movement of nozzle 23 by follow-up link 43 so that valve portions can assume their null positions when the opening 31 assumes its new position with respect to the nozzle. Therefore, the position of shaft 13 is a measure of compressor pressure ratio $(P_{t_3}/P_{t_2})$. A ratiometer of the present type is fully disclosed in U.S. Patent No. 2,864,393, granted December 16, 1958, to John A. Drake.

The thrust regulation of the engine is obtained by controlling the engine to operate at a scheduled value of compressor pressure ratio as a function of power lever position. The profile of cam 4 is determined by the relationship between engine thrust and compressor pressure ratio and is designed to provide essentially a constant percentage of thrust available at each position of power lever 2. The ratiometer 12 provides an indication of measured compressor pressure ratio which is compared to the value selected by cam 4 through the use of lever 9. Any difference between the selected and measured value causes the arm 8 to move relative to the surface of cam 4, which movement causes a displacement of servo valve of fuel computer 44 (see Figure 4) in a direction to eliminate the error and bring the compressor pressure ratio to the scheduled value. The operation of the fuel computer 44 is hereinafter described in connection with the main fuel system.

*Inlet temperature senser*

It is necessary to bias the schedule of compressor pressure ratio with the function of compressor inlet total temperature $(T_{t_2})$ to obtain full lever resolution at all ambient conditions.

An inlet temperature senser (see Figure 3) is utilized for this purpose and has a bimetallic senser 46 located at the inlet of the compressor. The senser 46 has a body portion 47 to which is connected an outer metallic tube 48 having a series of openings 49 and an inner tube 50 having openings 51 is secured at end 52 to the outer tube 48. The tubes 48 and 50 are constructed of metals having different coefficients of thermo-expansion and the openings 49 and 51 permit circulation of air through the center to provide a rapid response to temperature changes. For instance, tube 48 can be constructed of stainless steel and tube 50 can be constructed of an aluminum alloy since the senser operates at relatively low temperatures. The wall thickness of tube 50 is less than the wall thickness of tube 48 so that the tubes have different heating rates and the sensing unit therefore has a fast response time for a given temperature change. The inner tube 50 carries a plug valve 53 which is slidably supported in an opening in body portion 47 and this plug valve cooperates with an opening 54 in the body passage to regulate the flow from passage 55 to passage 56. The body portion also has a passage 57 to return the leakage past the plug valve to passage 55. Since the tubes 48 and 50 have different coefficients of expansion, it is seen that the plug valve 53 will move relative to body portion 47 upon a change in temperature and thus vary the air flow through opening 54 in accordance with compressor inlet temperature. For instance, if the temperature increases, the inner tube will expand more than the outer tube and will cause valve 53 to move toward closed position and if the temperature decreases, the inner tube will contract more than the outer tube so that the valve 53 will move toward open position.

Figure 3:
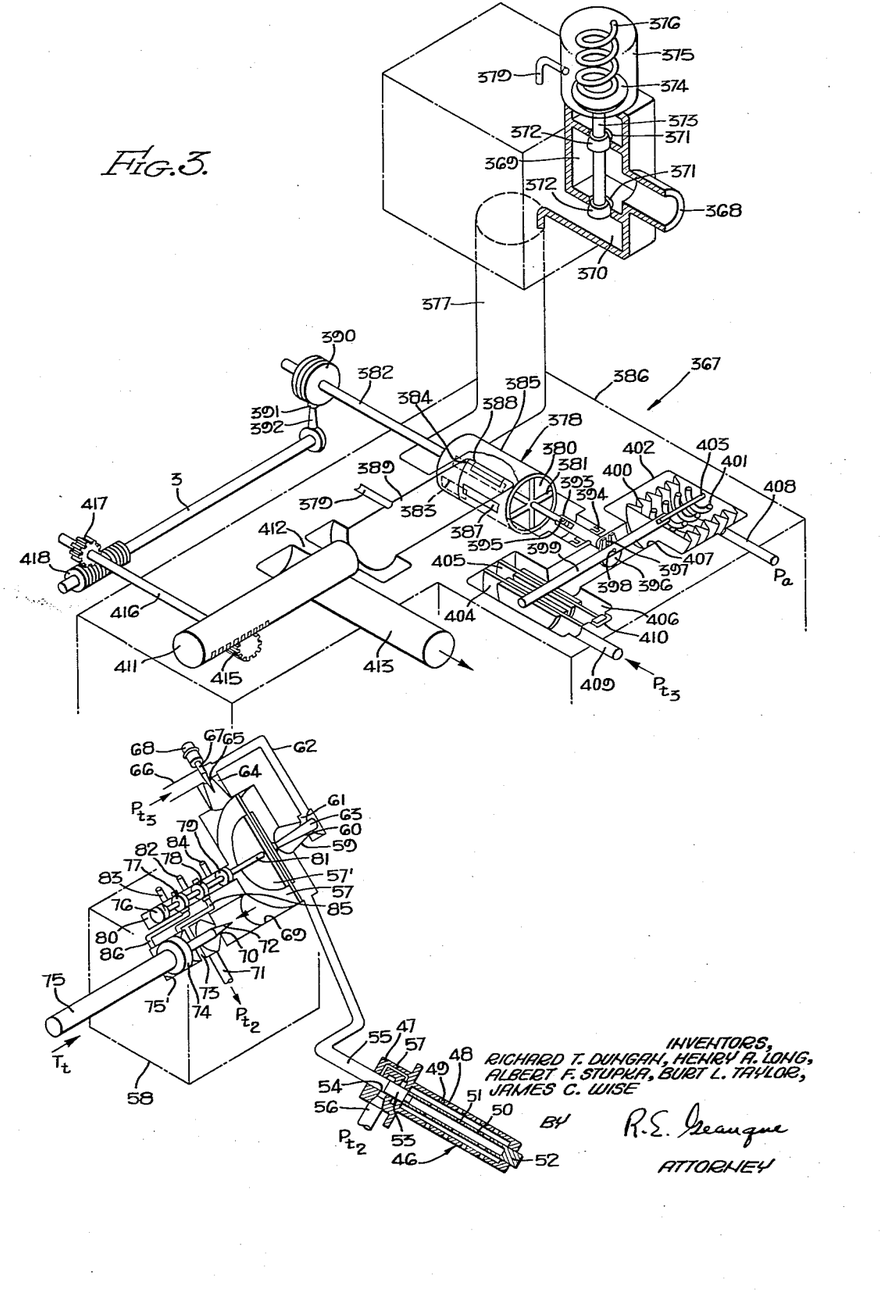
Figure 3 is a perspective view of a portion of the control system designated by numeral 3' in Figure 1 showing the device for measuring compressor inlet total temperature and illustrating the afterburner regulator.

The passage 55 connects with one side of a diaphragm 57 secured in a space in body 58 of the temperature amplifier. A passage 59 having a restriction 60 is also connected with the same side of diaphragm 57 and has an enlarged end portion 61 which connects with passage 62. A tapered valve 63 is secured to the rigid portion 57' of the diaphragm for movement within the restriction 60 in order to vary the area of the restriction in accordance with movement of the diaphragm. The passage 62 connects with pressure ($P_{t_3}$) while passage 56 connects with pressure ($P_{t_2}$) and the difference in these pressures is sufficient to cause sonic velocity flow at restriction 60 and at the opening 54, so that these two variable orifices form a pressure divider system such as described in U.S. Patent No. 2,645,240, issued July 14, 1953, to John A. Drake. Thus, the pressure on the side of the diaphragm 57 connected to needle 63 is a function of the pressure ($P_{t_3}$) and the ratio between the areas of orifices 54 and 60. Therefore, this pressure will vary with changes in the position of valve 53 in opening 54 which is a function of inlet temperature.

A passage 64 connects with the side of diaphragm opposite needle 63 and contains a restriction 65 which receives pressure ($P_{t_3}$) from passage 66. The effective area of restriction 65 can be varied by a tapered needle 67 which is mounted for adjustment by a knob 68. This same side of diaphragm 57 also connects with a passage 69 having a restriction 70 and the restriction exhausts to pressure ($P_{t_2}$) through passage 71. A tapered needle 72 is positioned within restriction 70 and is connected through partition 73, with piston 74, carried by a shaft 75 and movable in space 75' of body 58. Four spaced valve portions 76–79 are located in opening 80 and are carried by valve stem 81 connected to diaphragm 57. These valve portions control the high pressure fluid line 82 and low pressure lines 83 and 84 in order to control the pressure on the opposite sides of piston 74 through lines 85 and 86. It is therefore apparent that the restrictions 65 and 70 form the two orifices of a second pressure divider system and that the pressure on the valve stem side of the diaphragm will vary with the position of needle 72 within restriction 70.

In operation, a change in compressor inlet temperature will cause sensor 46 to change the area of orifice 54 and consequently the pressure on one side of diaphragm 57 connected to passage 55. This change in pressure will cause the diaphragm to move valve portions 76–79 in a direction to cause piston 74 and needle valve 72 to move and change the pressure on the other side of the diaphragm until the pressure on opposite sides are balanced and the valve portions are returned to their null position. Thus, the position of piston 74 and shaft 75 will be a function of compressor inlet temperature. For instance, if the valve 53 is opened upon a decrease in temperature the pressure on diaphragm 57 is reduced and the valve portions will move to connect the high pressure line 82 to passage 85 which will cause piston 74 to move in a direction to increase the area of orifice 70 and decrease the pressure on the opposite side of the diaphragm until the two pressures are equal. The valve portions will then return to their null position and the new positions of shaft 75 will represent the new temperature. If the valve 53 is closed by the sensor 46 upon an increase in temperature the valve portions and shaft 75 will move in the opposite direction until the new pressure in diaphragm 57 is balanced. The needle valve 63 also moves with the diaphragm 57 in order to adjust the pressure on the side of the diaphragm connected to passage 55 in a direction to compensate for the pressure change caused by valve 53 and thus prevent the system from overshooting upon a change in temperature.

The shaft 75 carries a yoke member 87 (see Figure 2) having its arms positioned in recess 88 of cam 4 so that movement of shaft 75 will move cam 4 along serrated portion 5 and thereby cause a change in the position of arm 8. The cam 4 is contoured along its length to compensate for changes in inlet temperature. If the temperature increases, the larger end of the cam 4 will move toward shaft 6 to reduce the fuel flow and if the temperature decreases the smaller end of the cam will move toward shaft 6 to increase the fuel flow. Since the thrust developed by the engine is a function of compressor inlet total temperature, it is necessary to correct for changes in this temperature in order that the position of lever 2 can select the desired percentage of thrust. It should be noted that the temperature amplifier contained in body 58 will still operate correctly when the orifice throat velocities are not sonic for the reason that the temperature amplifier is a pneumatic bridge and the Reynolds Number effects tend to cancel because of similarities in opposite legs of the bridge. The discharge ports must be vented to the same low pressure for low pressure ratios where the downstream bridge orifices are not sonic. It is understood that the discharge ports can be connected to some other low pressure besides pressure ($P_{t_2}$).

*Turbine discharge temperature senser*

An override is provided for arm 10 (see Figure 4) in order to prevent the turbine discharge temperature ($T_{t_5}$) from exceeding a given value by decreasing the engine fuel flow. The turbine discharge temperature senser is comprised of an amplifier 90 and a temperature sensing unit 91 located within the engine and aft of the compressor (see Figure 5). The unit has a base portion 92 to which is attached an outer tube 93 having a series of openings 94. An inner tube with openings 96 has one end 97 secured to the outer tube 93 and its other end carries a plug valve 98 slidable within base portion 92. The base portion 92 has an opening 99 connected to passage 100 and valve 98 controls the flow through passage 99 to exhaust passage 101, located in base portion 92 and connected to pressure ($P_{t_2}$). Since the tubes 93 and 95 are made of metals with different thermal coefficients, any change in discharge temperature will result in a change in position of valve 98. For instance, the tubes can be constructed of different compositions of stainless steel since the senser 91 operates at substantially higher temperatures than senser 46. Also, the wall thickness of the tube 95 is less than the wall thickness of tube 93 so that the tubes have different heating rates and the sensing unit therefore has a fast response time for a given temperature change. The openings 94 and 96 in tubes 93 and 95 respectively allow circulation of gases through the tubes to also provide a rapid response to temperature changes. The senser unit is so constructed that the valve 98 will normally block opening 99 but at such time as the maximum allowable turbine discharge temperature ($T_{t_5}$) is exceeded, the valve 98 will move to permit flow from opening 99 to passage 101. With an increase in temperature, the inner tube will expand more than the outer tube and cause valve 98 to move toward open position and when the maximum temperature is reached the valve will uncover opening 99. The different heating rates are provided to give a false temperature indication in order to compensate for the slow overall heating rate so that it will indicate a higher temperature during an increased temperature transient period than it would for equal heating rates between the inner and outer tubes.

Figure 4:
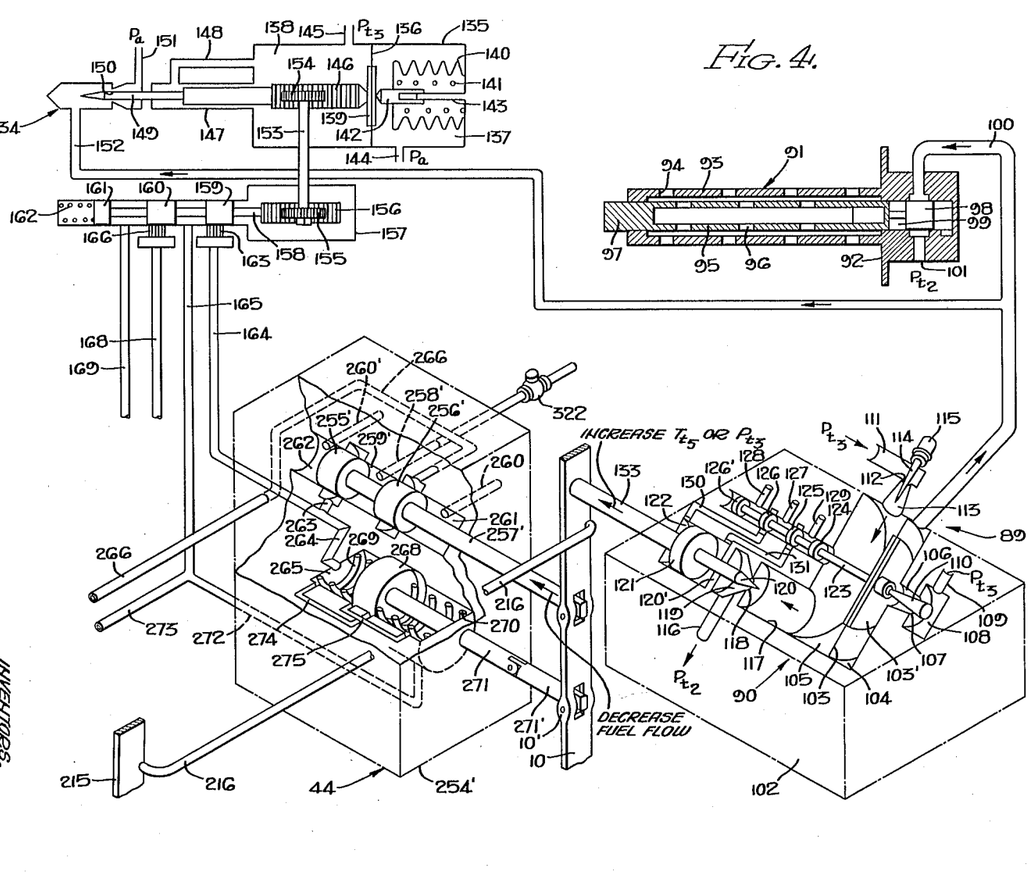
Figure 4 is a perspective view of a portion of the control system designated by numeral 4' in Figure 1 showing the altitude compensator, fuel computer and turbine discharge temperature senser.

The amplifier 90 has a body 102 containing diaphragm 103 between spaces 104 and 105. A passage 106 connects with space 104 and has a restriction 107 which leads to space 108 receiving pressure ($P_{t_3}$) through passage 109. A tapered needle valve 110 is secured to rigid member 103' of diaphragm 103 and is positioned within restriction 107 to vary the area of the restriction. The passage 100 leads to space 104 and thus the restriction 107 and the opening 99 form the two orifices of a first pressure divider system. A second pressure divider system has a passage 111 for transmitting pressure ($P_{t_3}$) through restriction 112 and passage 113 to space 105. The restriction 112 contains a needle valve 114, the position of which can be adjusted by knob 115 in order to vary the area of the orifice. The space 105 exhausts to pressure ($P_{t_2}$) in passage 116 through passage 117, restriction 118 and space 119. A needle valve 120 is positioned within restriction 118 and connects, through partition 120', with piston 121 slidable in space 122 of body 102. Thus, the needle valve 120 moves with the piston 121 to vary the area of restriction 118 and the restrictions 112 and 118 serve as the two orifices of the second pressure divider system.

A valve stem 123 is connected to member 103' of diaphragm 103 and carries four valve portions, 124, 125, 126 and 126' which control the high pressure fluid line 127 and low pressure fluid lines 128 and 129 in order to admit pressure fluid to opposite sides of piston 121 through lines 130 and 131. The piston 121 has a piston rod 133 which engages arm 10 to reduce the engine fuel supply when an excessive turbine discharge temperature ($T_{t_5}$) is encountered. When this temperature is below the maximum value, the valve 98 closes opening 99 and the pressure in space 104 would become equal to ($P_{t_3}$), except for the action of the altitude compensator to be presently described. Thus, needle valve 120 must close orifice 118 until the pressure in space 105 equals that in space 104. However, when valve 98 moves to connect passages 100 and 101, the pressure in space 104 will be reduced and diaphragm 103 will displace the valve portion to cause the piston 121 to move in a direction to open the area of restriction 118 until the pressures are again equal on the opposite sides of the diaphragm, at which time the valve portions will return to their null position. This movement of the piston will cause piston rod 133 to move against arm 10 to override the operating schedule and reduce the fuel supply by moving the valve of fuel computer 44. The movement of diaphragm 103 results in a movement of needle valve 110 which prevents overshooting of the system since the area of orifice 107 is changed in a direction to make the pressures on the diaphragm more nearly equal.

During starting and low engine speed acceleration, the ratio of pressure ($P_{t_3}$) to pressure ($P_{t_2}$) is not high enough to cause sonic velocity flow at the orifices of the two pressure divider systems of the amplifier 90 and thus the orifice characteristics become nonlinear. However, this nonlinear operation can be compensated to a linear output with the proper needle contour so that the system can sense excessive discharge temperatures even when the discharge pressure ($P_{t_2}$) is low. The discharge pressure can be any other low pressure besides ($P_{t_2}$) so long as both divider systems discharge to the same low pressure. Also, since the amplifier 90 is a pneumatic bridge, it will operate correctly when the orifice velocities are not sonic since the Reynolds Number effects tend to cancel.

Altitude compensator

The altitude compensator 134 (see Figure 4) provides a means of measuring the absolute value of the compressor discharge total pressure ($P_{t_3}$) so that this value cannot exceed the allowable maximum limit. A casing 135 contains a diaphragm 136 located between spaces 137 and 138 and having rigid support member 139. The space 137 contains an evacuated bellows 140 which is spring loaded by spring 141 positioned between the end of the bellows and the casing 135. A member 142 is secured to the end of the bellows for movement therewith and one end of member 142 bears against support member 139. The other end of member 142 has a slit for receiving a projection 143 of casing 135, which projection serves to guide the movement of member 142. Space 137 is connected to atmospheric pressure through passage 144 while space 138 is connected to compressor total discharge pressure ($P_{t_3}$) through passage 145. A rack 146 is positioned in space 138 and has one end bearing against support member 139 while the other end is slidable in extension 147 of the casing. A by-pass 148 is provided to maintain the pressure on the end of rack 146 equal to ($P_{t_3}$).

The altitude compensator 134 is so designed that the effective area of diaphragm 136 is equal to the effective area of the spring loaded evacuated bellows 140 so that $$P_{t_3} = K_{t_{(x)}}$$

where "K" is a constant that includes the effective areas of the diaphragm and bellows and the spring constant and "$x$" is the displacement of the rack (146). The measured value of $P_{t_3}$ is the absolute compressor discharge total pressure since the atmospheric pressure acts against both diaphragm and the bellows. The absolute pressure is therefore translated into an output movement.

The end of rack (146) carries a needle valve 149 which normally serves to close the restriction 150 positioned between passage 151, connected to atmospheric pressure, and passage 152, connecting with passage 100 leading to amplifier 90. Thus, the restriction 150 cooperates with the restriction 107 of amplifier 90 to form a pressure divider system which is parallel with the pressure divider system comprised of the opening 99 and the restriction 107. When the maximum limit on the compressor discharge total pressure is reached, the diaphragm 136 is displaced, allowing air to flow from space 104 of amplifier 90 through the orifice 150. This air flow reduces the pressure in space 104 and moves the valve portions to cause the piston 121 to move in a direction to engage rod 133 with arm 10 and override the operating schedule of the engine by moving the valve of the fuel computer 44 to close the main fuel valve. Thus, the amplifier 90 is under control of both the altitude compensator 134 and the temperature sensing unit 91 in order to prevent compressor discharge total pressure and turbine discharge total temperature from exceeding a maximum allowable value. It is therefore apparent that input to amplifier 90 can be a pressure representing any function, including but not limited to temperature or pressure, and the amplifier can be used for any purpose where an output displacement is required from a given input disturbance. Also, it is obvious that a number of functions represented by pressures can be connected in parallel to the amplifier for joint control of the amplifier.

The altitude compensator 134 also has a shaft 153 which carries a first pinion gear 154 in mesh with rack 146 and a second pinion gear 155 in mesh with a rack 156 in casing 157. A valve stem 158 connects with rack 156 and carries two valve portions 159 and 160 and an end portion 161. A spring 162 is contained in the end of casing 157 and continually bears against end portion 161, so that springs 141 and 162 serve as centering springs for the valve portions 159 and 160. The valve portion 159 controls the flow through a divided orifice 163 connected with fuel computer 44 through lines 164 and 165 and the valve portion 160 controls the flow through a divided orifice 166 connected with the exhaust nozzle area computer 167 (see Figure 5) through lines 168 and 169. The orifices 163 and 166 are in parallel with the feedback systems of the fuel computer 44 and the exhaust nozzle computer 167 and these orifices are throttled by the valve portions to give the correct integral time constant for any given compressor discharge total pressure. This throttling will be explained in more detail in connection with the description of the computers.

Corrected speed senser

The corrected speed senser 170 (see Figure 2) is utilized to obtain a signal of engine rotative speed divided by the square foot of compressor inlet total temperature ($T_{t_2}$). This signal ($N/\sqrt{T_{t_2}}$) is obtained as a shaft position which is a function of corrected speed.

The value ($N/\sqrt{T_{t_2}}$) is a unique function of ($P_{t_3}/P_{t_2}$) at any compressor operating point and for each value of ($N/\sqrt{T_{t_2}}$) there is a corresponding value of ($P_{t_3}/P_{t_2}$) at which compressor stall will occur. Thus, the corrected speed senser provides a means of measuring a basic compressor parameter which is independent of the nature of the air being pumped by the compressor. The signal of ($N/\sqrt{T_{t_2}}$) can be utilized to override the fuel schedule in order to prevent compressor stall when the value of $P_{t_3}/P_{t_2}$ becomes too high.

A passage 171 is connected to the $P_{t_2}$ pressure probe and leads to a space 172 through a valve 173 which is continually rotated at a fraction of engine speed by gear 174 and which has a slot 175 in position to register with the inlet 176 of passage 171 during a portion of each revolution. A passage 177 also connects with space 172 and has its inlet 178 in position to register with slot 175 during a portion of each revolution of valve 173. In operation, the inlet 176 is opened a sufficient amount for the pressure in space 172 to equal the pressure in line 171 while the outlet 178 is closed. Thereafter, both the inlet and outlet are closed until 178 is opened for a sufficient time to allow the pressure in chamber 172 to equal the pressure in passage 177, while inlet 176 remains closed. After outlet 178 is closed, both the inlet and outlet remain closed until the cycle starts to repeat.

The passage 177 connects with a space 179 in body 180 and space 179 connects with a chamber 180' through restriction 181. A passage 182 continually connects chamber 180' with an engine driven vacuum pump (not shown) so that the chamber exhausts to pressure substantially lower than ($P_{t_2}$). A diaphragm 183 is located in body 180 between space 179 and space 184 and space 184 receives the pressure ($P_{t_2}$) from passage 185 containing restriction 186. The space 184 is also connected with a passage 187 which contains a restriction 188 containing a needle valve 189 positioned by a knob 190. The passage 187 is connected to the vacuum pump through line 191, chamber (180') and passage 182. Thus, the restrictions 186 and 188 form the two choked orifices of a pressure divider system and since the area of both orifices are fixed, the space 184 will continually receive a constant fraction of the pressure ($P_{t_2}$).

A needle valve 192 is positioned within restriction 181 and is connected to a piston 193 for movement therewith. The diaphragm 183 has a rigid support member 183' to which is connected a valve stem 193a carrying four valve portions 194, 195, 196 and 197. These valve portions cooperate with high pressure fluid line 198 and low pressure fluid line 199 and 200 in order to control the fluid flow to opposite sides of piston 193 through lines 201 and 202. The end of the valve stem 193a carries a needle valve 203 positioned within restriction 204 which receives the pressure in space 179 through line 205 and the restriction exhausts to the vacuum pump through passage 191.

In operation, the pressure in space 184 will be maintained at a given fraction of the pressure $P_{t_2}$ as determined by the setting of needle valve 189. As long as the pressure in space 179 is equal to that in space 184, the diaphragm will be balanced and will hold valve portions 194—197 in their null position. Since the pressure $P_{t_2}$ is introduced to passage 171 and to passage 185, any change in this pressure will not disturb the diaphragm 183. However, if the speed of the engine increases, more air is delivered to space 179 which will increase the pressure within the space and move diaphragm 183 against the pressure in space 184. This movement will cause valve portion 195 to connect line 201 with high pressure line 198 and cause the piston 193 to move in a direction to increase the area of orifice 181. This increased area will increase the mass flow through the orifice and reduce the pressure in space 179 until it again equals the pressure in space 184 and the new position of piston shaft 206 will be proportioned to the new corrected speed. In the event that engine speed is reduced, the valve portion will move in the opposite direction to close down the area of orifice 181 and the piston rod will move in the opposite direction to indicate the decreased corrected speed. If the temperature $T_{t_2}$ of the air entering passage 171 increases at constant engine speed, the mass flow through the meter decreases to cause a decrease in pressure in space 179 and the valve portions will then operate in the same manner as upon a decrease in engine speed to close the orifice 181 and thereby indicate a lower corrected speed. If the temperature decreases, the mass flow to space 179 will increase, and the position of shaft 206 will indicate a higher corrected speed. Because of the fact that the operation of the corrected speed senser is based upon the equations of state, as will presently be shown, simultaneous variations in speed and temperature will also act together as described independently above to give a single value of corrected speed. Upon an increase in pressure in space 179, the valve portion will move needle 203 in a direction to open orifice 204 and this will decrease the pressure in space 179 so as to prevent overshooting of the valve portions. Upon a decrease in pressure in space 179, the needle 203 will move in a direction to close the orifice 204 and prevent the expected decrease in pressure and overshooting of the valve portions.

It can be shown that the area of orifice 181 will vary as a function of $N/\sqrt{T_{t_2}}$ so that the position of piston rod 206 is a function of corrected speed. Since the valve 173 meters volume flow, the quantity flow through the valve Q can be formulated as follows:

$$Q=KN$$

where K is a constant and N is the actual rotative speed of the valve. Also, from the equation of state $$Q=\frac{WRT_{t_2}}{P_{t_{2a}}}=KN$$

where W is the mass flow, R is the universal gas constant, $T_{t_2}$ is the total temperature entering the metering valve 173, and $P_{t_{2a}}$ is the total pressure entering the metering valve.

The orifice 181 meters mass flow and from the flow equation for the orifice, it can be shown that $$A_c=\frac{C_1 W\sqrt{T_{t_2}}}{P_{t_{2b}}}$$

where $C_1$ equals .53, $A_c$ is the area of the choked orifice 181 and $P_{t_{2b}}$ is the total pressure leaving the valve 173. It is also apparent that the diaphragm 183 and its servo system holds the pressure ratio across valve 173 constant since the pressure $P_{t_2}$ is introduced to lines 171 and 185. Therefore, $P_{t_{2a}}/P_{t_{2b}}$ is equal to a constant. By substituting for W in the orifice mass flow equation, it can be shown that $$A_c=\frac{K_1 N}{\sqrt{T_{t_2}}}$$

where K is another constant. Thus, the area $A_c$ is proportional to $N/\sqrt{T_{t_2}}$ and the displacement of shaft 206 can be represented as follows:

$$y=\frac{K_2 N}{\sqrt{T_{t_2}}}$$

where "y" is the shaft position and $K_2$ is a constant determined by $K_1$ and the contour of the needle valve 192. The shaft 206 has a rack 207 which meshes with a gear 208 on one end of shaft 209 and the other end of shaft 209 carries a cam 210 which is positioned to move follower 211 connected to shaft 6. The shaft 6 is slidably mounted in support 212 and movement of shaft 6 will be transmitted to arm 8 of lever 9 so that should the corrected speed exceed a maximum value, at which compressor stall will occur, the cam 210 will move the end of shaft 6 off the cam 4 and will move the arm 8 in order to override the output schedule and prevent stall. The end of a shaft 206 is also positioned so that it can bear against arm 213 of lever 214 in order to control the area of the exhaust nozzle in a manner that will be later described. The needle 192 is contoured to have a slight slope at its end connecting with a portion of steeper slope and the steeper portion will control the area of orifice 181 when shaft 206 is in contact with arm 213. The end portion of less slope serves to control only the position of cam 210 and provides for less movement of the cam per unit change in corrected speed than does the steeper portion.

*Actual speed senser*

The lever 214 has an arm 215 which is connected to the exhaust nozzle computer 167 and a bar 216 (see Figure 4) is positioned to contact first arm 215 of lever 214 and then arm 10 of lever 9. The actual speed senser 217 (see Figure 5) is for the purpose of preventing overspeeding of the engine during both normal and afterburner operation. A gear 217 is carried by a shaft 218 which is connected to the engine shaft in any well-known manner so that the shaft 218 rotates at a speed proportional to the actual engine speed. The shaft 218 carries a cup-shaped member 219 which is rotatively supported within body member 220 by two sets of ball bearings 221 and 222. The member 219 has a flange 223 which carries two arms 224, each pivotably mounting a flyweight 225. The flange 223 also has two projections 226, each of which pivotably mounts a lever 227. Each lever 227 has an arm 228 which is connected to one end of one flyweight so that movement of the flyweight will pivot the lever 227 and cause arm 229 of the lever to move along the axis of shaft 218. A spring 230 is contained within cup-shaped member 219 and has one end bearing against this member while the other end bears against a flange 231 carried by valve stem 232. The ends of lever arms 229 carry knobs 233 which bear against flange 231 on the opposite side from spring 230 so that movement of arms 229 by flyweights 225 will move valve stem 232 against the force of the spring.

The body member 220 supports an annular cylinder 234 containing a piston 235 in which are centrally located the valve portions 236, 237 and 238 carried by valve stem 232. This piston 235 and cylinder 234 form spaces 239, 240 and 241 and the space 240 connects with high pressure fluid line 242 which passes through cylinder support arm 243. The valve portion 237 controls the flow of high pressure fluid from passage 244 to either space 239 or 241 through passage 245 or 246, respectively, and the valve portions 236 and 238 cooperate with enlarged bores 247 and 248, respectively in the piston 235 in order to exhaust either space 239 or 241. An arm 249 is secured to piston 235 and is pivotably connected to an arm 250 which receives support pin 251 carried by post 252 secured to cylinder support arm 243. The arm 250 has an angular extension 253 positioned so that its end can engage and move bar 216.

When the speed of shaft 218 is increased, the flyweights 225 move outwardly and displace the valve portions from the null position. High pressure fluid then flows to space 241 and space 239 opens to exhaust so that the piston 235 will move toward spring 230 and in a direction to null the valve portions. In the event the engine overspeeds, the movement of piston 235 will cause extension 253 to transmit the overspeed signal to bar 216 and to the exhaust nozzle and fuel flow computers. A lever 254 is pivotally supported by post 254' secured to body member 220 and is connected at one end to valve portion 238 and at the other end to rod 255 carrying a valve 256 positioned within a cylinder 257. The chamber has a space 258 connecting with a line 259 from the fuel valve and the chamber 257 exhausts to atmosphere. The position of valve portion 238 represents the amount of overspeed of the engine so that the flow to atmosphere past valve 256 will increase as the overspeed increases. Therefore if overspeed continues after bar 216 is moved, the increased flow past valve 256 will result in a reduction of engine fuel flow to the main engine as will be later described.

During non-afterburner operation, the actual speed senser 217 acts simply as an override to prevent excessive engine speed. Upon movement of bar 216 by extension 253, the bar first encounters the arm 215 of lever 214 and actuates the exhaust nozzle computer 167 in order to close the nozzle and slow down the engine. However, if the speed doesn't reduce because of malfunctioning of the exit nozzle controls or for any other reason, the bar 216 will engage arm 10 of lever 9 and will actuate the fuel flow computer 44 in order to reduce engine fuel flow. This sequential operation results because the end of bar 216 adjacent arm 10 is shorter than the end adjacent arm 215. The corrected speed senser 170 continually tries to hold the engine corrected speed at some selected value, during both afterburning and non-afterburning operation. However, the corrected speed will be overriden during afterburning operation, in a manner later described, and the actual speed senser 217 will control the exit nozzle and the fuel flow computer to prevent overspeed.

*Fuel flow computer*

The fuel flow computer 44 (see Figure 4) achieves proportional-plus-integral control with altitude compensation and therefore provides a rapid dynamic response and a zero steady state error. Of course, the purpose of the computer and its various controls is to supply the correct quantity of fuel to maintain the maximum efficiency for all flight conditions and altitudes within the operating range of the turbojet engine. The computer body 254' has an opening for receiving valve portions 255' and 256' carried by a valve stem 257' which has one end pivotly connected to arm 10 for movement therewith. A high pressure fluid line 258' connects with space 259' between the valve portions and drain lines 260 and 260' connect with spaces 261 and 262, respectively. The valve portion 255' controls the field flow through passage 263 which connects with line 164 and with line 264 leading to one end of opening 265 in body 254'. The valve portion 256' controls the fluid flow through passage 266 which leads to the fuel valve actuator piston 267 (see Figure 6). Opening 265 contains a piston 268 which is centered by springs 269 and 270 and the piston has a rod 271 which is pivotably connected to an arm 271' which is in turn pivotably connected at 10' to arm 10. A passage 272 leads from the end of opening 265 which contains a spring 270 and connects with line 165 and with line 273 which also leads to the fuel valve actuator piston 267. The body 254' has two unloading passages 274 and 275 which permit fluid to flow from one side of piston to the other upon a large displacement of the piston in either direction.

When the valve portions 255' and 256' and piston 268 are in the null position, the arm 10 is held at its pivot point with arm 271' by the spring forces on the piston 268. Referring to Figure 2, any rotation of cam 4 will cause movement of the pivot point 11 and movement of arm 10 about pivot 10' while spring 6' will hold the end of shaft 6 in contact with cam 4. Thus, movement of the cam by the control shaft 3 to engage the lower cam surface will move the valve portions 255' and 256' in order to increase the fuel flow to the main engine, while movement toward the higher cam surface will move the valve portions in a direction to decrease the fuel flow. Also, in the event that the actual compressor pressure ratio is different from that called for by the cam 4, the shaft 13 will move to cause pivot point 11 to move, since the shaft 6 will continually be held against the surface of the cam 4. If shaft 13 moves toward arm 8, the arm 10 will pivot about point 10' and move the valve portions in a direction to decrease the fuel flow to the engine while movement of the shaft 13 in the opposite direction will increase the fuel flow. When the pressure ratio selected by cam 4 exceeds any value set by the corrected speed through cam 210, the cam 210 will engage follower 211 and move arm 8 away from the cam surface and pivot arm 10 in a direction to prevent further increase in fuel flow. As the speed increases, the cam 210 will back away, permitting fuel flow to increase with corrected engine speed along the preset schedules. Another adjustment in position of the valve positions occurs when the maximum allowable turbine discharge temperature or the absolute value of compressor discharge total pressure is exceeded and shaft 133 moves against arm 10 to pivot the arm about point 10' and move the valve portion in a direction to reduce the fuel flow to the engine. Of course, the valve portions act to adjust the engine fuel flow by moving actuator piston 267.

In the event that a force is produced on one end or the other end of arm 10, the valve portions will be displaced and the piston 268 will move almost immediately to return the valve portions toward their null position, even though some error persists in engine fuel flow. Any remaining error will cause a rate of flow to the actuator piston in proportion to the error and therefore cause the error to be removed as a time integral of the error. This rapid movement of piston 268 is the result of the high volume fluid flow from the valve portions to the feedback piston 268 since the valve portions open a large port area for a small axial displacement. For instance, if the valve portion 255' moves to connect passages 263 and 264 with high pressure line 258', the piston 268 will be moved in the opposite direction to move the valve portions back to approximately their null positions. The movement of the piston 268 will cause fluid to flow in lines 272 and 273 to one side of the actuator piston 267 while the other side of the piston will exhaust through line 266 and space 261 to drain 260. Thus the initial movement of the actuator piston will be proportional to the error as introduced to the valve portions. The amount of movement of the valve portions will determine the pressure differential across piston 268 which in turn is determined by the amount of compression of spring 270. This pressure differential will be applied across orifice 163 with the high pressure in line 164 and the lower pressure in line 165. A rate of flow will exist through orifice 163 proportional to the pressure differential as determined by the computer valve displacement which is in accordance with remaining error. The flow through orifice 163 connects with line 273 so that the actuator piston 267 will receive fluid at a rate proportional to the error and the piston 267 will be positioned in accordance with the time integral of the error. The time constant is determined by the position of the valve 159 of the altitude compensator 134 which is in series with the valve portion 255' of the fuel computer. Movement of the piston 267 reduces the fuel flow to the engine in order to eliminate the error and when the error is eliminated, lever 10 will move to null the valve portions and eliminate the differential pressure on piston 268 so that the piston can again be centered by the springs 269 and 270. The same action takes place when valve portion 256' is moved to connect high pressure line 258' to line 266 so that the actuator piston 267 is moved in the opposite direction in proportion to the error and the actuator piston will exhaust through line 272 to build up the pressure on the side of piston 268 receiving the force of spring 270. The remaining error will establish a pressure differential across orifice 163 with the high pressure in line 165 and the low pressure in line 164. This same pressure differential will be established across feedback piston 268 from the high pressure in line 272 and the low pressure in line 264. The flow through the orifice 163 permits the actuator piston 267 to exhaust through line 164 at a rate proportional to the existing error represented by the displacement of the valve portions so that fluid will flow to the piston 267 from line 266 at a rate proportional to the error and the piston will be positioned in accordance with the time integral of the error. This movement of the piston 267 will increase the fuel flow to the engine in order to eliminate the error which caused valve portion 256' to open. The unloading passages 274 and 275 are not uncovered for normal operation, however, if a sufficient phase shift occurs in any one of the components of the fuel computer 44, the unloading parts may become uncovered and provide a rapid error recovery. The altitude compensator 134 continually acts to adjust the integral time constant of the fuel computer by positioning the restrictor valve 159 in accordance with pressure $P_{t_3}$. Since the acceleration rates of the engine depend upon mass flow through the engine and since pressure $P_{t_3}$ is approximately a measure of mass flow, the position of restrictor valve 159 is matched to the engine with $P_{t_3}$ as the parameter. Changes of engine speed, flight speed and altitude all effect the mass flow through the engine but $P_{t_3}$ is always a measure of mass flow regardless of the reason for variation in mass flow. For instance, upon an increase in altitude with the engine operating at rated constant corrected speed, the mass air flow will decrease and since the forces required to accelerate the engine depend upon mass flow, the engine accelerating torque will decrease. Therefore, at high altitudes where $P_{t_3}$ decreases, the valve 159 will move to close orifice 163 in order to increase the time constant of the integrating portion of the fuel computer so that main fuel flow valve will operate at a slower rate to correspond with the lower accelerating rates of the engine. Because the valve 159 is positioned in accordance with the engine time constant, the fuel computer provides the desired stability of control.

*Main fuel system*

The fuel flow to the engine combustion chamber is one of the basic engine control parameters and must be regulated to obtain the desirable engine output. Referring to Figure 6, fuel passage 276 connects with the engine fuel pump (not shown) which can be of the positive displacement type. A chamber 277 connects with passage 276 and supports an interior chamber 278 which has two openings for seating valves 279 and 280 carried by a valve stem 281. The fuel from passage 276 surrounds chamber 278 and the fuel pressure acts against diaphragm 282 which separates chamber 277 from a chamber 283. The chamber 283 contains spring 284 acting on the diaphragm 282 in a direction to close the valves and a passage 285 connects the chamber with the pressure in passage 286 downstream of the fuel valve 287, presently to be described. When the pressure of the fuel from the pump exceeds the downstream pressure in line 285 plus the force of spring 284, the valves 279 and 280 will open to allow a portion of the fuel to return to the pump inlet through passage 288. Thus, the valves serve to maintain a constant pressure drop across the fuel valve 287 so that the open area of the valve 287 will be a measure of the fuel flow to the engine.

The passage 276 connects with a chamber 289, which in turn receives the open end of fixed sleeve 290 of the fuel valve. The fixed sleeve 290 contains two slots 291 and 292 which are positioned within the inlet to downstream passage 286 which surrounds the sleeve. A metering valve 293 is slidably fitted within fixed sleeve 290 and is connected to actuator piston 267 by means of legs 292' connected between rod 293' and the interior of the valve. The valve 293 has an elongated slot 294 and a shorter slot 295 which cooperate with slots 291 and 292, respectively, to meter the fuel flow to the engine. An end of rod 293' is inserted in a member 296 and has projection 297 slidable in a slot in the member so that the metering valve 293 can be moved longitudinally of sleeve 290 by the actuator piston 267. Seal 298 supports member 296 for rotation and a shaft 299 connects a grooved member 300 to the end of member 296.

In order to maintain the fuel flow to the engine between the operating limits of rich and lean mixture, it is necessary to adjust the fuel flow for changes in the compressor discharge total pressure ($P_{t_3}$) since it has been determined that both the permissible rich and lean fuel flow mixture varies as a function of ($P_{t_3}$). A rod 301 is secured at one end to a bellows 302 which is evacuated and houses a spring 303 which bears against the top of the bellows. The end of rod 301, positioned interiorly of the bellows, has a slot which receives pin 304 on fixed shaft 305 so that the end of the rod can slide upon and be supported by the shaft. The space 306 surrounding the bellows is connected to atmospheric pressure ($P_a$) through passage 307 and the pressure also acts against diaphragm 308, which is likewise secured to rod 301 and has the same effective area as bellows 302. A second diaphragm 309 having an area equal to that of diaphragm 308 is also connected to rod 301 and is subject to pressure $P_{t_3}$ introduced into space 310 through passage 311, orifice 312, line 259 and line 313. The passage 313 connects with passage 314 through restriction 315 and space 316. A valve 317 is located in passage 314 and is normally in closed position but will be manually opened to override the complete control system during manual control of the fuel valve by the pilot. The area of restriction 315 is varied by a reversed needle 318 connected to rack 319 which meshes with gear 320 on control shaft 3. Also, the valve 257 in line 259 (see Figure 5) is normally closed when the engine is not overspeeding. During normal operations, the position of rod 301 represents the value of $P_{t_3}$ absolute because of the various forces acting upon the rod. A passage 321 connects both sides of diaphragm 308 to atmospheric pressure so that if diaphragm 309 is ruptured, a pressure differential will still be available around diaphragm 308 and pressure $P_{t_3}$ will still move rod 301 against spring 303. The rod 301 carries a pin 322 positioned within the groove of member 300 so that movement of the rod will rotate metering valve sleeve 293. It is apparent that rotation of the sleeve will change the open flow area defined by slots 291 and 294 and by slots 292 and 295 and that longitudinal movement of the sleeve by piston 267 will give the same result as far as the flow area between slots 292 and 295 is concerned. The slot 294 is of sufficient length that the ends of slot 291 will always be positioned between the ends of slot 295 regardless of the position of piston 267 so that the only control of fuel flow through these two slots is by movement of rod 301. Thus, the opening between slots 291 and 294 serves to control the lean mixture limit and will always be large enough to prevent the fuel flow from reducing to the point where the engine will cease to function. Since the slots 292 and 295 overlap, the opening defined by these slots will be controlled both by the movement of piston 267 and by the rotational movement of metering valve sleeve 293 caused by movement of rod 301. The movement of actuator piston 267 is under control of the fuel computer 44 and when the computer calls for a larger fuel flow, the slot 295 will be moved to increase the opening formed with slot 292 and when the computer calls for a decreased fuel flow, the slot 295 will be moved in the opposite direction. The opening between slots 292 and 295 is also controlled by the pressure $P_{t_3}$ through rod 301 so that the opening between the slots cannot become so large that the fuel flow will exceed the rich limit of the engine.

Figure 8:
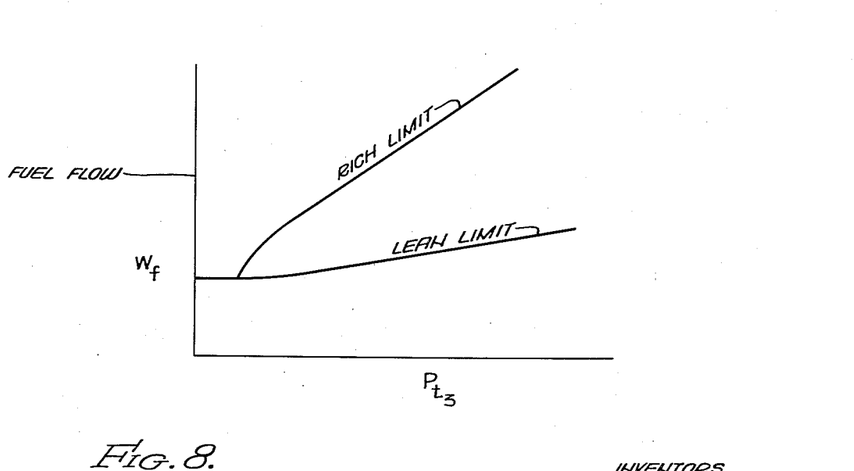
Figure 8 is a curve showing of fuel flow through the main fuel valve as a function of $P_{t_3}$ and illustrating the rich and lean limits.

Figure 8 is a plot of fuel flow vs. the pressure ($P_{t_3}$) at the discharge of the compressor showing the curves of rich limit and lean limit between which the fuel valve 287 will operate. This curve is derived from the characteristic curve of fuel air ratio vs. $P_{t_3}$ at the rich and lean limits for the burners and from the equation of air flow through the turbine nozzles in nozzle stator 19'. Since the pressure $P_{t_4}$ at the entrance to the nozzles can be approximated as a fraction of $P_{t_3}$ because there is a nearly constant pressure loss in burner 19'', the air flow $W_a$ through the nozzles can be expressed as $$W_a = \frac{KAP_{t_3}}{\sqrt{T_{t_4}}}$$

where K is a constant, A is the throat area of the nozzles having sonic flow, and $T_{t_4}$ is the turbine inlet total temperature. From the above equation and from the curve of fuel air ratio vs. ($P_{t_3}$) at the rich and lean limits, the fuel flow can be approximately calculated for each value of $P_{t_3}$ at the rich and lean limits. The calculation will be in error by the inaccuracy resulting from assuming values of $T_{t_4}$ for use in the equation. In practice, the assumed temperature is based on the range of possible temperatures for each value of $P_{t_3}$ at the rich and lean limit. The final design value of temperature is thus arbitrarily determined and the calculation based on the design value results in the plot of Figure 8. Thus, the fuel valve 287 is designed to observe this plot and regulate the maximum and minimum fuel flow within the rich and lean limits. It is desirable to utilize $P_{t_3}$ (2) for control purposes, since the measuring temperature is cooler than that at $P_{t_4}$ and therefore $P_{t_3}$ is easier to use than $P_{t_4}$.

In the event of failure of the hydraulic system of the fuel computer 44, it is possible to control the fuel flow to the engine directly from the manual control shaft 3. When such a control is required the valve 317 is opened and valve 322 in the high pressure fluid line 258' of the fuel computer (see Figure 4) is closed so that no fluid pressure will exist on actuator piston 267 and spring 232 will move the metering valve sleeve 293 in a direction to give maximum openings between the metering slots. With the valve 317 open, the restrictions 312 and 315 become the two orifices of a pressure divider system as described in U.S. Patent No. 2,645,240, granted July 14, 1953, to John A. Drake. The pressure divider system will provide a pressure in passage 313 which is a function of the pressure $P_{t_3}$ entering restriction 312 and of the area ratio between restrictions 312 and 315 because the pressure $P_{t_3}$ is high enough to cause sonic velocity flow at the throat of each restriction. The movement of the needle valve 318 within the restriction serves to vary the throat area of restriction 315 and since the needle valve is geared to control shaft 3, the area of restriction 315 will vary with the position of the control shaft. When the area of restriction 315 is reduced, the pressure in passage 313 will increase in order to rotate the metering valve 291 by rod 301 in a direction to increase the fuel flow to the engine and when the area of the restriction 315 is increased, the pressure in passage 313 will decrease so that rod 301 will rotate the valve 291 in a direction to decrease the fuel flow. Thus, the fuel flow can be directly and solely under manual control which overrides the fuel computer 44. The passage 259 connects space 313 with atmospheric pressure ($P_a$) across valve 256 of the actual speed sensors 217 (see Figure 5). Thus, when the engine overspeeds during manual control of the fuel valve by shaft 3, the valve 256 will move to open line 259 to atmospheric pressure which will result in reducing the pressure in passage 313, caused by the pressure $P_{t_3}$, in proportion to the amount of overspeed the error as introduced to arm 215 and when the error is eliminated, the arm 215 will move to null the valve portions and eliminate the differential pressure on piston 354 so that the piston can be centered by spring 355 and 356. The same action takes place when valve portion 340 is moved to connect high pressure line 343 to line 349 so that the actuator piston 350 is moved in the opposite direction and the piston will exhaust through line 360 and 359 to build up the pressure on the side of the piston 354 receiving the force of spring 355. The remaining error will establish a pressure differential across orifice 166 with the high pressure in line 169 and the low pressure in line 168. The same pressure differential will be established across feed back piston 354 from the high pressure in line 360 and the low pressure in line 352. The flow through the orifice 166 permits the actuator piston 350 to exhaust through line 169 at a rate proportional to the existing error represented by the displacement of the valve portions so that fluid will flow to the piston 350 from line 349 at a rate proportional to the error and the piston will be positioned in accordance with the time integral of the error. This movement of the piston 350 will decrease the exhaust area of the exit nozzle in order to reduce the corrected speed and eliminate the error as introduced to arm 215. The body 339 contains two unloading ports 365 and 366 which permit fluid to flow from one side of the piston to the other upon a large displacement of the piston in either direction. During engine deceleration accompanied by very large engine speed errors, the exhaust nozzle must move from closed position to approximately wide open position. During such operation, the amount of displaced fluid in the exhaust nozzle actuator piston 350 is much greater than the volume of the fluid in the feed back piston 354. The unloading ports serve to limit the pressure drop across the restrictor valve 166 and high pressure fluid will flow from the valve portion 341 through the unloading port 365 directly to the actuator piston 350. Thus, for large speed errors the control will revert to high integration and a rapid movement of the exhaust nozzle actuator piston. The altitude compensator 134 continually acts to adjust the integral time constant of the exhaust nozzle computer by positioning the restrictor valve 160 in accordance with pressure $P_{t_3}$ which is a measure of mass flow through the engine. As discussed in connection with the fuel computer 44, the position of valve 160 will thus vary with the acceleration rates of the engine to vary the time constant of the integrating part of the exhaust nozzle computer so that the exhaust nozzle area will vary at a rate corresponding to the acceleration rates of the engine.

Afterburner fuel control

The afterburner fuel control 367 (see Figure 3) serves the purpose to regulate the amount of fuel flow to the afterburner 367' in order to obtain the desired engine output. Fuel is supplied through passage 368 to the inner chamber 369, held within the outer chamber 370. The inner chamber 369 has two valve ports 371 which cooperate with the two valve portions 372 carried by valve stem 373 which is secured at one end to a diaphragm 374 positioned to close the end of a chamber 375. A spring 376 is contained in chamber 375 and continually bears against the diaphragm 374 in order to move the valve portions 372 in a direction to open ports 371. The fuel supply pressure within the outer chamber 370 also acts on diaphragm 374 in a direction against the force of spring 376. The outer chamber 370 connects with the fuel passage 377 leading to the fuel valve 378 and a passage 379 connects the chamber 375 with the fuel line in a position downstream from the valve 378. The fuel supply to passage 368 can be provided by a turbo pump (not shown) and it is understood that the valve portions 372 serve to throttle the fuel flow from passage 368 to passage 379 in a manner to maintain a constant fuel pressure drop across the valve 378. If the pressure within the outer casing 370 becomes too high, the valve portions 372 will be moved to close the ports 371 to reduce the pressure in the outer casing and if the pressure becomes too low, the portions will move to open the valve ports 371 in order to increase the pressure in casing 372. In the event a positive displacement pump were utilized for the fuel supply, as in the case of the main engine fuel supply, it would be possible to utilize a by-pass to maintain a constant pressure drop across the fuel valve rather than to utilize the throttling valve.

The fuel valve 378 has an inner valve sleeve 380 which is supported by arms 381 extending from a rod 382 and this sleeve contains slots 383 and 384. An outer sleeve 385 is securely held in body 386 and contains slots 387 and 388 which cooperate with the slots 383 and 384, respectively, of the inner sleeve in order to meter the fuel flow from passage 379 to passage 389. One end of rod 382 carries two collars 390 between which is located a ball 391 carried by the end of lever arm 392 which is secured to the end of the control shaft 3 so that rotation of the control shaft will move the inner valve sleeve 380 longitudinally with respect to the outer sleeve 385. The other end of shaft 382 is received by a member 393 which is supported for rotation by seal 394 and has a slit which receives a pin 395 carried by the rod 382 so that the rod can slide relative to the member 393 and will rotate with the member 393. A bracket 396 is secured to the end of member 393 and has a slit 397 for receiving a pin 398 carried by a rod 399. One end of rod 399 is secured to an evacuated bellow 400 containing a spring 401 and located within space 402 of body member 386. This end of the arm is guided by a projection 403 secured to the body member while the other end of the rod 399 is connected to two diaphragms 404 and 405 located within space 406 of the body member. The spaces 406 and 402 are connected together by a passage 407 so that atmospheric pressure ($P_a$), admitted to space 402 through a passage 408, can operate on one side of the diaphragm 405 and also on the bellows 400. A passage 409 directs the compressor discharge total pressure ($P_{t_3}$) to one side of diaphragm 404 and since the diaphragm 405 receives atmospheric pressure, it is seen that the movement of rod 399 will be in proportion to the absolute value of pressure ($P_{t_3}$). A by-pass 410 is positioned around the diaphragm 404 so that if a high pressure ($P_{t_3}$) should rupture the diaphragm 404, the rod 399 would still move in accordance with pressure ($P_{t_3}$) even though there was some leakage around the diaphragm 405 and thus a pressure differential would still be maintained. Movement of rod 399 in response to changes in the pressure ($P_{t_3}$) will cause rotation of the inner sleeve 380 relative to the outer valve sleeve 385 in order to vary the discharge area between the slots in the inner and outer sleeves. A manual cut-off valve 411 controls the opening in partition 412 in order to control the fuel flow from passage 389 to passage 413 leading directly to the afterburner. The valve 411 has a series of teeth 414 along its surface which cooperate with gear 415 carried by a shaft 416 which has a second gear 417 at its other end in mesh with worm gear 418 on control shaft 3. Thus, rotation of the shaft 3 will rotate shaft 416 in order to move the valve 411 and open and close the passage in partition 412.

After control shaft 3 has been rotated to the afterburner position, this rotation will be sufficient to open the cut-off valve 411 and thereafter the fuel flowing to the afterburner will be controlled by fuel valve 378. Slot 384 in the inner sleeve 380 is of sufficient length so that the slot 388 will always be positioned between the ends of slot 384. However, the slot 383 does not exceed the length of slot 387 so that longitudinal movement of the sleeves will cause a change in the opening between slot 387 and 383. Also, since the slots in the two valve sleeves are of approximately the same width it is seen and to the position of valve 256. This reduction in the pressure 313 will cause rod 301 to move metering valve sleeve 293 in a direction to reduce the fuel flow through the fuel valve 287 until the overspeed condition is corrected, at which time the valve portion 256 will again close passage 259 and the fuel valve will again be under the control of the position of shaft 3. Therefore, the valve portion 256 acts as an override for the manual fuel control in order to prevent overspeeding of the engine.

A main fuel cut-off valve is positioned in passage 286 between the fuel valve 287 and the burner for the engine. The passage 286 connects with engine fuel line 325 through a restriction 326 which receives the tapered end 327 of hollow, cut-off valve 328. The valve 328 has rack teeth 329 which mesh with pinion gear 330 on the end of control shaft 3 so that the valve 328 will be moved within restriction 326 upon movement of the control shaft. A sleeve 331 slidably supports the valve 328 and has an annulus 332 which is normally opposite openings 333 in valve 328 when the valve is in its closed position. Since the valve 328 is hollow, fuel will flow through the sleeve and openings 333 to annulus 332 and then back to the fuel pump inlet through passages 334 connected with the annulus. However, when the valve is in open position, as shown in Figure 6, the openings 333 will be closed by sleeve 331 to prevent return flow to the fuel pump and fuel will flow to the engine through restriction 326 and passage 325. Thus, the by-pass lines 334 relieve the pressure in the fuel system when the cut-off valve is closed. As will be described later, the cut-off valve opens when the control shaft 3 is advanced from cut-off to the engine idle position on the throttle quadrant.

*Exhaust nozzle computer*

The exhaust nozzle computer 167 (see Figure 5) serves the purpose of selecting the exhaust nozzle area which will maintain maximum efficiency for all flight conditions and altitudes within the operating range of the turbojet engine. The control lever 214 (see Figure 2) has a fixed pivot point 335 against which the arm 213 of the lever is continually loaded by spring 336 carried by a fixed body 336'. Since the spring 336 bears against arm 213 at a point between the pivot point 335 and the end of shaft 206 of the corrected speed senser 170, any movement of shaft 206 will cause arm 213 to tilt and thereby move the position of pivot pin 337 to cause a tilting of arm 215 which will result in actuation of the nozzle computer 167. As will be presently described, the shaft 206 will not be in contact with arm 213 until the corrected speed has reached a value where it is desired to close the exhaust nozzle. The bar 216 of the actual speed senser 217 has one end which can bear against the arm 215 and in the event that the actual speed of the engine exceeds the allowable value, bar 216 will override the control by the corrected speed senser shaft 206 and cause the arm 215 to actuate the nozzle computer 167 in a manner to reduce the engine speed. The control shaft 3 carries a cam 338 which normally does not engage the arm 213 of lever 214. However, upon rotation of the control shaft into afterburning position, the cam 338 will move arm 213 against spring 336 until the arm 213 bears against the end of the cam as a new pivot point. Thus, during afterburning operation, the control by the corrected speed senser shaft 206 is overridden for reasons later to be discussed.

The nozzle computer 167 is similar to construction to fuel flow computer 44 and achieves proportional plus integral control in order to provide rapid dynamic response and a zero steady state error. The computer body 339 has an opening for receiving valve portion 340 and 341 carried by a valve stem 342 which has one end pivotably connected to arm 215 for movement therewith. A high pressure fluid line 343 connects with space 344 between the valve portions and drain lines 345 and 346 connect with spaces 347 and 348, respectively. The valve portion 340 controls the fluid flow through passage 349 which leads to one side of nozzle actuator piston 350. The valve portion 341 controls the fluid flow through passage 351 which connects with line 168 and with line 352 leading to one end of opening 353 in body 339. A piston 354 is centered within opening 353 by springs 355 and 356 and is connected to arm 215 by piston rod 357 and an arm 358, which is pivotably connected at one end to rod 357 and at the other end to arm 215. A passage 359 leads from the end of opening 353 which contains spring 355 and connects with line 169 and with line 360 which connects with the side of nozzle actuator piston 350 opposite the side connecting with passage 349. The exhaust end of the engine supports a variable area exhaust nozzle which can be comprised of a number of segments 361 positioned around and pivotably connected to the exhaust end of the engine. The segments are interconnected in any well-known manner to permit movement of the segments about their pivot points and still prevent leakage of exhaust between the segments. A rod 362 is connected between the actuator piston 350 and an annular ring 363 in order to move the ring along the axis of the engine. The ring 363 carries a series of rollers 364 against which the surface of the segments 361 are pressed by the pressure of the gasses leaving the engine. Therefore, when the rollers 364 are moved forward, the segments will be moved inwardly to reduce the area of the exhaust nozzle and when the rollers move rearwardly, the segments will be forced outwardly to increase the exhaust area.

The arm 215 is held at its pivot point with arm 358 by the spring forces on the piston 354. In the event that a force is produced on the arm 215 by either rod 206 or bar 216, the valve portions will be displaced and the piston 354 will move almost immediately to return the valve portions toward their null position, even though some error persists in the position of the exhaust nozzle. This rapid movement of piston 354 is the result of a high volume fluid flow from the valve portion to the feedback piston since the valve portion opens a large pressure area for a small actual displacement. For instance, if the valve portion 341 moves to connect passages 351 and 352 with the high pressure line 343, the piston 354 will be moved in the opposite direction to move the valve portions back to approximately their null position. The movement of piston 354 will cause fluid to flow in line 359 and 360 to one side of the actuator piston 350 while the other side of the piston will exhaust through line 349 and space 347 to drain 345. Thus, the initial movement of the actuator piston 350 will be proportioned to the error introduced to the valve portions.

The amount of movement of valve portions will determine the pressure differential across piston 354 which in turn is determined by the amount of compression of spring 355. This pressure differential will be applied across orifice 166 with the high pressure in line 168 and the low pressure in line 169. A rate of flow will exist through orifice 166 proportional to the pressure differential as determined by the computer valve displacement which is in accordance with remaining error. The flow through orifice 166 connects with line 360 so that the actuator piston 350 will receive fluid at a rate proportional to the error and the piston will be positioned in accordance with the time integral of the error. The time constant is determined by the position of the valve 160 of the altitude compensator 134 which is in series with the valve portion 341 of the exhaust nozzle (167) computer. Movement of the piston 350 increases the exhaust area of the exit nozzle of the engine in order to increase the corrected speed and eliminate that any rotation of the inner sleeve by the rod 399 will change the area between slots 383 and 387 and slots 384 and 388. Since the opening between slots 384 and 388 is only controlled by the rotation of the inner sleeve 380 and by rod 399, it is apparent that the opening will be under control of the pressure ($P_{t_3}$) so that a sufficient quantity of fuel will always be supplied to the afterburner to prevent lean blow-out. It has been determined that the fuel flow to the afterburner is a function of pressure ($P_{t_3}$) in the same manner as the fuel flow to the main engine, and that the curve of lean and rich mixtures can be determined by the plot of fuel flow against pressure $P_{t_3}$. Therefore rotation of the valve sleeve by rod 399 will increase the fuel flow in accordance with changes in pressure ($P_{t_3}$). Longitudinal movements of the inner sleeve by rod 382 will determine the curve upon which the engine operates between the allowable rich and lean mixture limits. The opening between slots 384 and 388 will always be maintained sufficient for operation of the engine on the lean mixture curve and the relative longitudinal movement and rotational movement between slots 383 and 387 will determine the amount of fuel above the lean mixture which will flow to the afterburner. Therefore the fuel valve 378 is under the direct control of control shaft 3 and also under the direct control of the absolute pressure ($P_{t_3}$) which maintains the fuel flow between the allowable rich mixture and the allowable lean mixture. When the control shaft 3 is rotated sufficiently to open cut-off valve 411, the cam 338 will be moved into a position so that the arm 213 bears upon the end of the cam as the pivot point. Thereafter, the corrected speed senser 170 becomes ineffective and the speed control will be by the actual speed senser 217 operating through bar 216 on arm 215 of the lever 214.

*Basic control loops*

The maximum rated thrust of a turbojet engine is usually obtained by operating at maximum rated engine speed and at a maximum value of some characteristic temperature. The temperature most often used for control is the value of turbine discharge temperature at which the engine is found to give acceptable life characteristics. However, the actual limiting temperature is really the turbine inlet temperature ($T_{t_4}$) but measurement problems make this parameter impractical for control usage at the present time.

Figure 7:
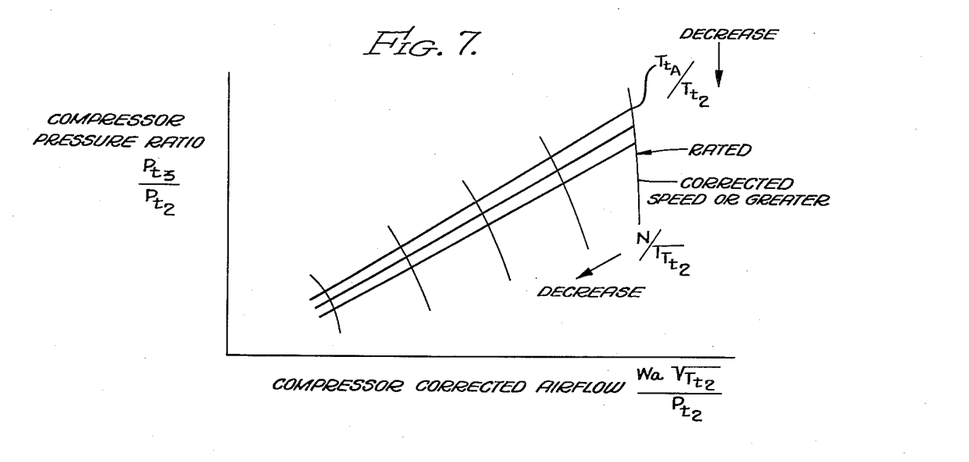
Figure 7 is a curve of compressor pressure ratio $(P_{t_3}/P_{t_2})$ vs. compressor corrected airflow with corrected turbine inlet temperature lines superimposed.

The present control system operates the engine at rated corrected speed, because this mode of operation provides maximum air flow to the engine. Operating at rated true speed would provide no more thrust if the corrected air flow did not increase. The curve of Figure 7 represents the relationship between corrected speed ($N/\sqrt{T_{t_2}}$), compressor pressure ratio ($P_{t_3}/P_{t_2}$) and compressor corrected airflow for an axial flow compressor with corrected turbine inlet temperature lines ($T_{t_4}/T_{t_2}$) superimposed. It is seen that for a given value of corrected turbine inlet temperature, the corrected airflow ($Wa\sqrt{T_{t_2}}/P_{t_2}$) increases with corrected speed until rated corrected speed is attained. At this speed, the compressor is pumping as much air flow as it possibly can. The control system operates the engine on the rated corrected speed line unless true speed considerations interfere. In actual operation below about 55% thrust, the exhaust nozzle is held wide open by the corrected speed servo since shaft 206 does not contact arm 213. However, when the engine speed reaches the corrected speed giving maximum air flow for the engine, the corrected speed senser maintains the corrected speed constant thereafter at the higher pressure ratio by moving arm 213.

Engine thrust can be varied with the engine operating at constant corrected speed by operating at various corrected turbine inlet temperatures and maximum thrust will be obtained at a value of corrected temperature corresponding to the limiting true temperature. Since corrected temperature ($T_{t_4}/T_{t_2}$) and true temperature ($T_{t_4}$) are related by $T_{t_2}$, it is necessary in the control system to compensate for temperature ($T_{t_2}$). Because it is difficult to directly measure temperature ($T_{t_4}$), it is more desirable to utilize a control parameter arrived at through thermodynamic relationships. From the relationships shown in Figure 7, the compressor pressure ratio can be utilized to select a value of inlet turbine temperature. Thus, by having the control shaft 3 select a value of $P_{t_3}/P_{t_2}$ for each position of control lever 2 and value of $T_{t_2}$, the lever 2 also selects a value of $T_{t_4}$ as a function of lever position. By properly contouring cam 4, it is possible to adjust the schedule between lever position and $T_{t_4}$ for each valve of $T_{t_2}$, so that the engine thrust, which is mainly a function of airflow and $T_{t_4}$, will be nearly a linear function of lever position. The inlet temperature senser serves to translate cam 4 along the control shaft and at each longitudinal position on cam 4, the cam has a surface contoured to give linear thrust variation between allowable maximum and minimum values.

Thus, there are two basic control loops for the engine control system. The first loop serves to maintain maximum airflow through the engine by maintaining constant rated corrected speed and consisted of the corrected speed senser acting on the exhaust nozzle computer to control the area of the exhaust nozzle. The second loop serves to select a turbine inlet temperature for each value of compressor inlet temperature by selecting a value of compressor pressure ratio which is corrected by compressor inlet temperature. This second loop consists of the pressure ratiometer and the compressor inlet temperature senser acting on the fuel computer to control the fuel flow to the engine.

*Normal operation*

The control shaft 3 carries an indicator 419 which cooperates with a quadrant 420 having inscribed thereon indices to indicate the degree of rotation of the control shaft by the control lever 3. When the engine is stopped the indicator 419 will be at zero degrees on the quadrant and the main fuel cut-off valve 328 will be closed in order to prevent any fuel flow to the main engine. At the time it is desired to start the engine, the control shaft will be moved until the indicator is at approximately the seven degree mark at which time the cut off valve 328 will permit fuel flow to the engine so that the engine can be started. Once the engine has been ignited in any well known manner, the control shaft is then moved so that the indicator corresponds with the 26 degree mark on the quadrant and the fuel flow will then be sufficient to maintain the engine idling condition. The starting procedure consists of turning on the ignition switch while the engine is rotating at cranking speed and when the control shaft is moved to the idling position the selector cam will set a value of the pressure ratio so that the fuel flow remains at the lean limit value. The engine will then idle at lean limit and minimum speed until further advancement of the power lever. In the quadrant range between 26 and 86 degrees, the engine will operate under regulated dry thrust with no afterburning and the scheduled thrust in this range will be selected by the selector cam 4 to give a percentage thrust proportional to quadrant portion. In other words, in the quadrant position between about 26 and 86 degrees, thrust regulation is obtained by controlling the engine to operate at a scheduled value of compressor pressure ratio as a function of the control shaft position, and each position of power lever 3 corresponds to the rotational position of the ratio selector cam 4. The profile of this cam is determined by the relationship between thrust and compressor pressure ratio and is designed to provide essentially a constant percentage of thrust available at each power lever position. Thus, from zero percent dry thrust (26 degrees on the quadrant) to 100 percent dry thrust (86 degrees on the quadrant), the thrust is approximately linear so that each degree on the quadrant represents about 1.7 percent thrust. It is necessary, as previously described, to bias this schedule with the function of compressor inlet temperature for full lever resolution at all ambient conditions. The temperature $T_{t_2}$ sensed by the inlet temperature senser 46 causes the cam 4 to be translated on the power shaft 3 in order to continually obtain such a biasing of the schedule. The ratiometer 12 provides an indication of measured compressor pressure ratio which is compared to selected value by means of lever 9 and any difference between the selected and measured value of the pressure ratio causes a displacement of the fuel computer control valve in a direction that will eliminate the difference. The fuel computer 44 positions the fuel valve 287 in proportion to the pressure ratio error and the integral of the error thereby insuring zero steady state error and each longitudinal position of the main fuel valve corresponds to a fuel flow because the pressure drop across the valve is regulated at a constant value. Fuel flow to the engine determines the value of compressor pressure ratio sensed by the ratiometer 12, thereby closing the loop through the engine and controls.

The exhaust nozzle remains in the maximum area position whenever corrected engine speed is less than its scheduled value. If the fuel flow required to obtain the selected pressure ratio tends to cause overspeeding, the exhaust nozzle automatically closes to provide isochronous operation. Thus, most of the thrust range is available at constant engine speed. If engine fuel flow results in a measured value of corrected speed greater than the set value, the corrected speed signal from shaft 206 of the corrected speed senser 170 displaces the lever 214 and moves the servo valve of the exit nozzle computer 167. This computer is a proportional-plus-integral device which operates in the same manner as the fuel computer 44 and it meters hydraulic fluid to the exhaust nozzle actuating piston 350 until corrected engine speed becomes quiescent at the set value. In the quadrant range between 26 degrees and about 56 degrees, the engine speed will be too low to cause maximum air flow to the engine and therefore, within this range, the exit nozzle will be in the wide open position. However, at speeds corresponding to quadrant position above about 56 degrees the corrected speed senser will act on lever 214 to permit maximum air flow to the turbine and prevent speed increases which would give no added air flow. By controlling the exit nozzle with the corrected speed, the engine will always have maximum air flow and the turbine will only run so fast as to provide this maximum flow.

Since the compressor stall line of any axial flow compressor is uniquely devised as a function of compressor pressure ratio and corrected engine speed, there is a maximum value of compressor pressure ratio which can be realized at each corrected speed and any further increase of pressure ratio would cause stall of the compressor. In order to avoid the stall region during accelerations, a limit is placed on the value of pressure ratio which has been selected by means of the control shaft 3 and this limit is allowed to increase as corrected speed increases until it becomes greater than the selected value. In order to achieve this limit, the corrected speed senser 170 rotates the cam 210 which acts as a stop for the arm 8 of the pressure ratio lever 9 and if the selected value of pressure ratio exceeds the stall inducing value, the cam prevents an excessive signal from passing to the fuel computer 44. To provide over temperature protection for the compressor, the discharge temperature senser 89 measures the discharge temperature of the turbine and the output of the amplifier 90 displaces the lever arm 10 whenever the measured temperature exceeds allowable limits. Thus, whenever the allowable limit is exceeded, the fuel computer causes the fuel flow to the engine to be reduced until the temperature condition is eliminated. Some measure of over temperature protection is afforded by the compressor stall prevention system. Up to fairly high values of corrected speed, the turbine discharge temperature will be below its limiting value at the stall point. A further maximum temperature back-up is provided by the rich limit as established by the fuel valve.

When the engine operates at high values of compressor inlet pressure, there is a possibility of exceeding the stress limit of the compressor if the pressure ratio is excessive. In order to avoid this situation the altitude compensator 134 provides an override on the fuel system to limit the compressor discharge pressure to safe values. The pressure signal of the compensator acts through the temperature override system of the turbine discharge temperature senser 89 so that inlet total pressures above the limiting value will open the bleed valve 149 of the compensator in order to give a false temperature signal and thereby reduce the fuel flow until the discharge total pressure is within the safe limit. A true speed senser 217 is utilized to provide a signal which overrides the corrected speed signal from shaft 206 when the actual speed exceeds a set value. In operation, the bar 216 of the true speed senser will first operate on arm 215 of lever 214 in order to close the exhaust nozzle area of the engine and thus reduce the engine speed. However, if for some reason the actual speed is not reduced in this manner, the bar 216 will then operate on arm 10 of lever 9 in order to reduce the fuel flow to the main engine. The true speed senser also operates during afterburning operation as the only speed control of the engine in a manner that will be discussed presently.

*Afterburner operation*

Afterburner operation can be selected by advancing the control shaft 3 through the quadrant position between 86 and 90 degrees, and the lever travel between 88 and 90 degrees automatically sequences the operations required to admit fuel to the afterburner manifold and to activate a hot streak ignition system. The cam 338 is rotated to move arm 213 and provide a false pivot point for the corrected speed senser. This movement of the cam will move the control valve of the exhaust nozzle computer 167 in a manner to cause the exhaust nozzle to move to a wide open position and because of the new pivot point provided for lever 214, the actual speed senser 217 will regulate the engine at maximum speed rather than at a selected corrected speed. This movement of the lever will also move the cut-off valve 411 in the afterburner fuel line to provide fuel to the afterburner and at the same time, the fuel pressure will energize the hotstreak ignition system. Over the quadrant position of 90 degrees to 110 degrees, each position of the control shaft 3 sets a value of fuel flow to the afterburner in order to regulate the afterburner thrust. The cam 4 for regulating the fuel to the main engine is flat over this quadrant range so that maximum fuel is supplied to the main engine during the control regulation of the fuel supply to the afterburner. Thus, the 86° position on the quadrant represents the limiting temperature and speed for the main engine and the afterburning fuel valve is designed to give a linear increase in fuel and thus a linear increase in thrust over the quadrant range of 90 to 110 degrees.

*Manual operation*

A manual control is provided to allow manual operation in the event of control failure and such manual operation is always available should control behavior become erratic or should the control pressure fail. When manual control is required, a valve 322 of the fuel computer 44 is manually closed to cause failure of fluid pressure to the fuel computer unit 44 and the valve 317 is open so that the orifice 315 provides a second orifice for the pressure divider system controlled by needle 318 which is manually positioned by the control shaft. When the fluid pressure fails, the spring 232 will move the fuel valve sleeve 293 to wide open position and thereafter manual fuel control of the engine can be maintained by manually positioning the control shaft to vary the position of needle 318 and the pressure on the diaphragm 309 within space 310. During this operation, the exhaust nozzle computer can continue to operate so that the normal speed control would be through the exhaust nozzle computer 167 while the main fuel control valve is manually controlled. However, should the exhaust nozzle computer fail, the actual speed sensor 217 is at a standby status to override the fuel flow to the engine, should the engine speed become excessive, by opening the valve 256 in order to reduce control pressure on the diaphragm 309. The needle valve 318 is constantly positioned by the control shaft 3 so that it is ready to take over on manual control at any time by causing variations in the area of restriction 315. Since the fuel valve for the afterburner is manually controlled by the position of control shaft 3, manual operation is also available for the afterburner in the afterburner quadrant.

By the present invention a turbojet control system is provided in which the fuel flow to the turbine is corrected in accordance with turbine inlet temperature by reason of the fact that the fuel flow is controlled by a combination of compressor pressure ratio and compressor total inlet temperature, which combustion gives a measure of turbine inlet temperature. Also, the control system varies the exhaust nozzle area in accordance with corrected engine speed so that the ideal controls are provided. A novel temperature senser is also provided which senses the compressor inlet temperature and provides a pneumatic output in response to temperature changes. A similar temperature senser is also utilized to measure the turbine discharge temperature so that the maximum value of this temperature cannot be exceeded. Also, a novel pressure senser unit is provided to obtain a measure of absolute total discharge pressure of the compressor and this unit can operate through the same amplifier as the turbine discharge temperature senser. The pressure senser is also utilized to vary the time constant of both the fuel computer and the exhaust nozzle computer. One novel means is disclosed for measuring the corrected speed of the engine but other means, utilizing a constant displacement air pump could also be used. As previously mentioned, the fuel flow computer and the exhaust nozzle computer give a proportional-plus-integral control with the time constant determined by the compressor discharge total pressure. A main fuel valve is incorporated in the control system which is capable of always maintaining the engine fuel supply between the allowable lean and rich mixtures. Since this allowable range varies with compressor discharge pressure, means are provided to continually correct the fuel valve area so as to compensate for changes in this pressure. A similar fuel valve is utilized to control the fuel flow to the afterburner so that the afterburner is always between the lean and rich mixture ranges which will prevent blow out of the burner. The main fuel control valve has the added feature that it can be manually controlled from the control shaft by utilizing a pressure divider system operating on the compressor discharge pressure. When afterburning is selected, the corrected speed senser is overriden so that the exhaust nozzle can be wide open and a false pivot point is provided so that the exhaust nozzle is under the control of the actual speed of the engine during afterburning operation. By utilizing the corrected speed senser to control the exhaust nozzle area it is unnecessary for the engine to rotate faster than is required to obtain maximum air flow to the engine. By thus controlling the engine speed at this level, increased life of the engine can be expected. Various modifications of the invention are contemplated by those skilled in the art without departing from the spirit and scope of the invention as herein defined in the appended claims.

What is claimed is:

1. A power amplifier comprising diaphragm means for receiving on one side thereof a pressure existing between a first pair of orifices, the other side of said diaphragm means receiving a pressure existing between a second pair of orifices, means for varying the area of one of the orifices of said first pair in accordance with an input signal, valve means controlled by movement of said diaphragm means resulting from a pressure differential on said diaphragm means, power means positioned by said valve means, and means attached to said power means for varying the area of one of the orifices of said second pair in accordance with movement of said power means in order to balance the pressures on said diaphragm means, said diaphragm means being connected with restricting means for varying the area of the other orifice of said first pair upon movement of said diaphragm means to prevent overshooting of said power means.

2. A power amplifier as defined in claim 1 wherein said restricting means comprises a tapered needle valve located within said other orifice of said first pair, said diaphragm means moving said needle valve in a direction to vary the area of said other orifice of said first pair in a manner to make the pressures on the diaphragm means more nearly equal.

3. A pneumatic power amplifier comprising differential pressure responsive means for receiving on one side thereof a pressure existing between a first pair of orifices, the other side of said differential pressure responsive means receiving a pressure existing between a second pair of orifices, means for varying one of the orifices of said first pair in accordance with an input signal, valve means controlled by movement of said differential pressure responsive means resulting from a pressure differential thereon, power means positioned by said valve means, means attached to said power means for varying the area of one of the orifices of said second pair in accordance with movement of said power means in order to balance the pressures on said differential pressure responsive means, and means connected with said differential pressure responsive means for varying the area of the other orifice of one of said pairs upon movement of said differential pressure responsive means in order to decrease said pressure differential.

References Cited in the file of this patent

UNITED STATES PATENTS

| | | |
|---|---|---|
| 1,321,287 | Daly et al. | Nov. 11, 1919 |
| 1,549,745 | Church | Aug. 18, 1925 |
| 1,743,385 | Partlow | Jan. 14, 1930 |
| 1,822,667 | Proell | Sept. 8, 1931 |
| 2,303,752 | Meredith | Dec. 1, 1942 |
| 2,312,671 | Otto | Mar. 2, 1943 |
| 2,409,871 | Krogh | Oct. 22, 1946 |
| 2,564,108 | Holley | Aug. 14, 1951 |
| 2,599,797 | Wilson | June 10, 1952 |
| 2,627,750 | Titus | Feb. 10, 1953 |
| 2,641,105 | Drake | June 8, 1953 |
| 2,645,240 | Drake | July 14, 1953 |
| 2,658,392 | Vannah | Nov. 10, 1953 |
| 2,667,743 | Lee | Feb. 2, 1954 |
| 2,669,094 | Lee | Feb. 16, 1954 |
| 2,677,385 | Markson | May 4, 1954 |
| 2,688,842 | Oestrich et al. | Sept. 14, 1954 |
| 2,743,735 | Du Bois | May 1, 1956 |
| 2,771,897 | Bailey | Nov. 27, 1956 |
| 2,775,231 | Silver | Dec. 25, 1956 |

FOREIGN PATENTS

| | | |
|---|---|---|
| 910,830 | France | Feb. 18, 1946 |